United States Patent
Nomura et al.

(10) Patent No.: US 11,373,035 B1
(45) Date of Patent: Jun. 28, 2022

(54) SYSTEMS AND METHODS FOR STRUCTURED REPORT GENERATION

(71) Applicant: Axon Enterprise, Inc., Scottsdale, AZ (US)

(72) Inventors: Stephen Nomura, Seattle, WA (US); Michael Wheeler, Seattle, WA (US); Timothy Wingerter, Seattle, WA (US); Tian Xia, Seattle, WA (US); Daniel Ladvocat Cintra, Seattle, WA (US); Sayce Falk, Seattle, WA (US); Michael Bohlander, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 16/864,154

(22) Filed: Apr. 30, 2020

Related U.S. Application Data

(60) Provisional application No. 62/926,401, filed on Oct. 25, 2019, provisional application No. 62/841,208, filed on Apr. 30, 2019.

(51) Int. Cl.
*G06F 40/174* (2020.01)
*G06F 3/0481* (2022.01)

(52) U.S. Cl.
CPC .......... *G06F 40/174* (2020.01); *G06F 3/0481* (2013.01)

(58) Field of Classification Search
CPC .......................... G06F 16/7837; G06F 40/174
See application file for complete search history.

(56) References Cited

U.S. PATENT DOCUMENTS

| | | | |
|---|---|---|---|
| 10,635,906 B1* | 4/2020 | Gan | G06K 9/325 |
| 2005/0198563 A1* | 9/2005 | Kristjansson | G06F 40/174 |
| | | | 715/224 |
| 2007/0033535 A1* | 2/2007 | Cornacchia, III | G06Q 10/10 |
| | | | 715/762 |
| 2009/0210225 A1* | 8/2009 | Simpson | G10L 15/26 |
| | | | 704/235 |
| 2018/0131898 A1* | 5/2018 | Guzik | H04N 5/91 |
| 2018/0144426 A1* | 5/2018 | Grbac | G06F 16/48 |
| 2018/0176474 A1* | 6/2018 | Blanco | G06F 40/169 |
| 2019/0042852 A1* | 2/2019 | Venkata Naga Ravi | |
| | | | G06F 3/03547 |
| 2019/0087398 A1* | 3/2019 | Kolesov | G06F 40/174 |
| 2019/0210548 A1* | 7/2019 | Levy | H04M 1/82 |
| 2020/0074245 A1* | 3/2020 | Koskan | G06K 9/00718 |

* cited by examiner

*Primary Examiner* — Ryan F Pitaro
(74) *Attorney, Agent, or Firm* — Andrew Graham

(57) ABSTRACT

Systems, devices, and methods generate a structured report based on unstructured data. Unstructured data may be received. One or more reference segments in the unstructured data may be detected. The one or more reference segments may be provided. A selection of at least one of the reference segments may be received. The one or more reference segments may be imported into the structured report in accordance with the selection. A structured report may be generated based on the detected one or more reference segments. Generating the structured report may include importing the reference segments. A records management system may generate the structured report based on unstructured data. A system may include first recording device, second recording device, and a server configured to generate a structured report from unstructured data recorded by the first recording device and the second recording device.

20 Claims, 17 Drawing Sheets

SYSTEMS AND METHODS FOR STRUCTURED REPORT GENERATION

FIELD OF INVENTION

Embodiments of the present disclosure relate to generating structured reports from unstructured data from one or more recording devices.

BRIEF DESCRIPTION OF THE SEVERAL VIEWS OF THE DRAWING

Embodiments of the present disclosure will be described with reference to the drawing, wherein like designations denote like elements, and:

FIG. 3 illustrates an exemplary interface for generating structured reports according to various aspects of the present disclosure;

FIG. 4 illustrates an exemplary interface for generating structured reports according to various aspects of the present disclosure;

FIG. 5 illustrates an exemplary interface for generating structured reports according to various aspects of the present disclosure;

FIG. 12 illustrates an exemplary interface for generating structured reports according to various aspects of the present disclosure;

DETAILED DESCRIPTION

Figure 1:
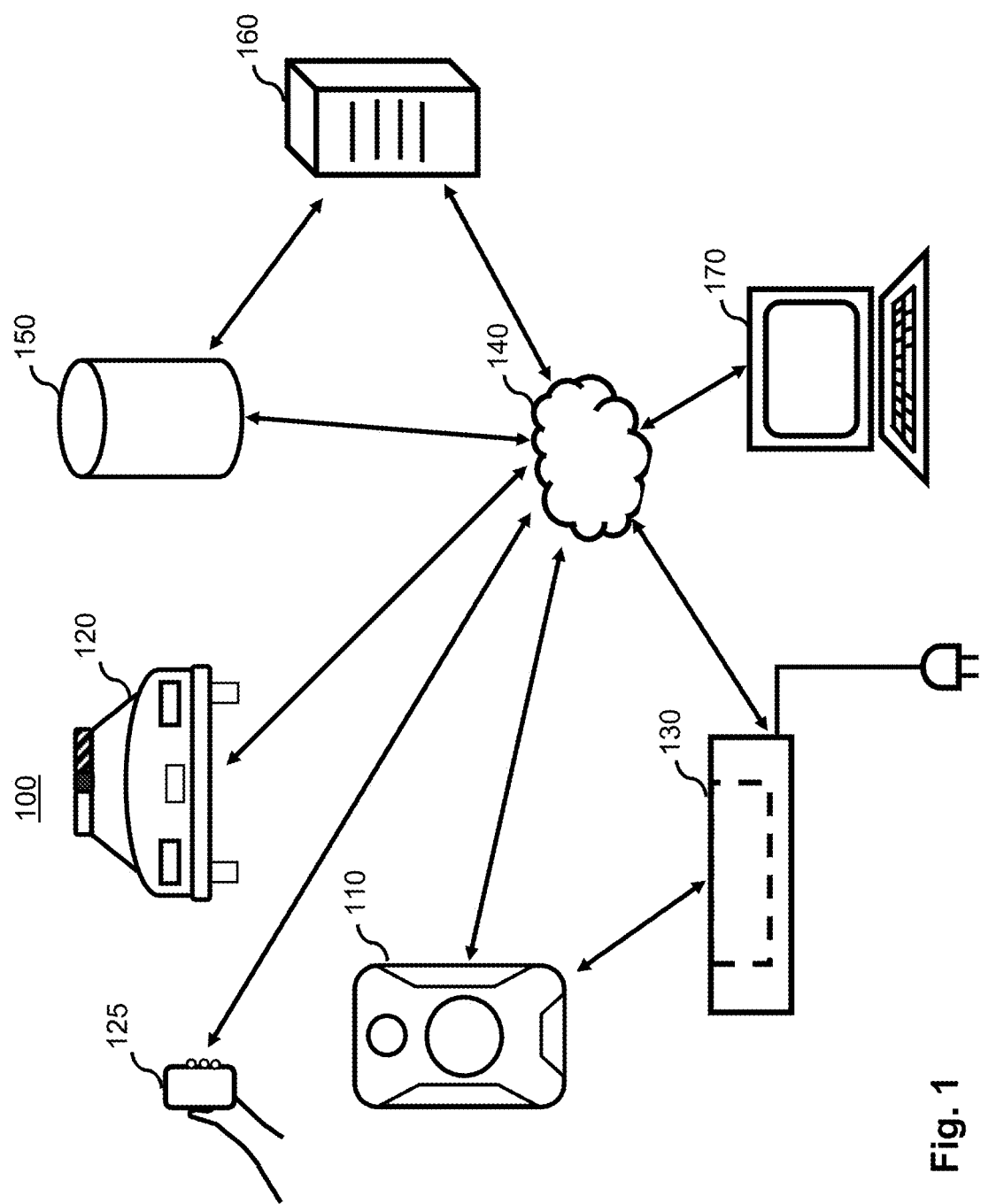
FIG. 1 is a diagram of devices associated with an example system for recording data and generating structured reports for an incident according to various aspects of the present disclosure.

Information may be captured by one or more recording devices (e.g., cameras, body cameras, vehicle-mounted cameras, audio recording devices, drone-mounted recording devices, etc.) at an incident (e.g., event). A report may be later generated regarding the incident. The report may require information in a predetermined format. In embodiments according to various aspects of the present disclosure, information may be extracted from data captured by the one or more recording devices and provided in the predetermined format to efficiently and accurately complete the report.

In embodiments, combining smart body cameras and other sensors with advanced and automatic processing techniques presents an opportunity to automate a large portion of incident documentation. Unstructured data captured in high volumes may be reduced to specific information in a predetermined format for a structured report. Relying on information captured by recording devices reduces the number of inputs necessary to generate a structured report and precludes the need for redundant information to be received by a records management system. Embodiments according to various aspects of the present disclosure address this technology-based issue by automatically detecting one or more portions (e.g., segments) of the unstructured data from which structured data for inclusion in structured report may be generated.

A report comprises data relating to an incident. A report may document facts surrounding a response by a responder (e.g., law enforcement officer, security personnel, etc.) to a single incident. A report may comprise logically structured data for the incident. A logical structure of the logically structured data may comprise sets of data relating to different facts of the incident. The sets of data may relate to what happened (e.g., occurred) during an incident, what or who was involved with the incident, and when the incident occurred. In embodiments, a report may include an incident type, one or more entities involved with the incident, and at least one narrative. In embodiments, an incident type, one or more entities involved with the incident, and at least one narrative may each correspond to a part or element of the structured report. For example, the incident type may relate to what happened during the incident and when the incident occurred, the one or more entities may relate to who or what is involved with the incident, and the at least one narrative may be related to what happened during the incident.

An incident type may describe an action. For example, an incident type may include an activity such as a theft, burglary, vagrancy, trespassing, assault, robbery, among others. An incident may include an incident code associated with each type of incident. An incident type may include a location at which the incident occurred or may have occurred. Information indicating an incident type may be included in a report. In embodiments, an incident type may include an offense.

One or more entities may be involved in an incident. An entity may include a person involved with an incident. For example, a person may include one or more of a responder, a victim, a suspect, and a witness. An entity may include a physical object involved with an incident. A physical object may include one or more of a vehicle, weapon, building, an item of personal property, an item of public property, and other physical items. A physical object may include evidence. Evidence may include electronic information responsive to and/or at an incident.

A report may include data related to the one or more entities associated with the incident. The data may provide information about the one or more entities. For example, a report relating to a burglary may include a person entity associated with the victim of the incident and a person entity associated with a suspect that may have committed the burglary. Such a report may also include entities associated with each item of property involved with the burglary, such as a building or vehicle.

A report may include a narrative. A narrative may include text data that describes relationships, actions, and sequences of actions between entities at the incident. A narrative may also include media data (e.g., audio, video, images, and text) and combinations of these media in a fluid, rich format. A narrative may indicate when an incident occurred. A narrative may include a responder that responded to the incident. For example, the narrative may indicate a name of the responder that responded to the incident.

A report may have a predetermined format. For example, a report may include at least one set of entity data and a narrative. Each set of entity data may include one or more predetermined fields for completion. A narrative may also include one or more predetermined fields for completion. A template may be provided for each entity and a narrative, wherein the template includes a plurality of predetermined, empty fields. For example, a template for an entity corresponding to a person may include blank fields for a first name, last name, date of birth, height, weight, identification document number (e.g., passport number, driver license number, etc.). A template for a narrative may include blank fields for one or more of person who can testify, a source of an incident response, and a description of the incident. A predetermined format for a report may include a combination of fields for data entry associated with a template for each entity, incident type, and narrative associated with the report.

A report may be portable. For example, a report may be printed or combined into a single file. The file may be a digital file. A report may be viewed and/or transported between different computing devices. A report may be viewable within a single browser, program, window, or other user interface element. A report may be viewable, displayed, or otherwise output by a single computing device. In embodiments, a report may include a copy of each set of text data and/or structured data included in the report.

A report may be verifiable. Each set of data in a report may be traced back to a source of information. For example, a narrative may be traced back to an audio file from which content of the narrative may be generated. Secondary data may be included in the report that indicates one or more sources for each set of data in a report.

FIG. 1 is a diagram of devices associated with an example system for recording data and generating structured reports for an incident according to various aspects of the present disclosure. Unstructured data including video data may be recorded by camera 110. Camera 110 may also capture unstructured data comprising one or more of image data, audio data, and position data. Camera 110 may be a body camera (e.g., bodycam, body-worn camera, wearable camera, etc.), configured to be mounted on a user during recording of unstructured data. The recording of data may be performed at a location at which a vehicle 120 is present. Vehicle 120 may also include a camera mounted therein that captures unstructured data comprising one or more of video, image, audio, and positional data. Vehicle 120 may include a mobile data terminal (MDT). An MDT may include a computing device mounted within vehicle 120. An MDT may include a screen for displaying data, such as report data. An MDT may also include one or more user interface elements (keyboard, mouse, touchscreen) for receiving inputs from a user, including inputs associated with selections from a user. An MDT may also enable certain structured data, such as text data, to be directly received and included in a report at vehicle 120. The data recording may alternately or additionally be performed at a location at which a mobile communications device 125 is present. Mobile communications device 125 may also include a camera mounted therein that captures unstructured data comprising one or more of video, image, audio, and positional data. Sensors in each of the vehicle 120, camera 110, device 125 may capture unstructured data. Recording devices according to various aspects of the present disclosure may include one or more devices, including a body camera, a vehicle-mounted recording device, and a mobile communications device.

The camera 110 may upload the recorded data via a dock 130, which may have a wired and/or wireless connection to server 160 by way of network 140. Alternately, camera 110 may transmit the recorded data directly to the server 160 by way of network 140 via a long-range wireless connection, such as an LTE communications channel and network. Vehicle 120 and device 125 may also transmit unstructured data to server 160 via network 140.

In some embodiments, the server 160 and/or the camera 110 may also transmit recorded data to data store 150. The recorded data, as well as structured reports, may be accessible for viewing at computing device 170. The recorded data and structured data may be accessible at device 170 via network 140. In embodiments, computing device 170 may download a copy of a report from data store 150, along with associated recorded data from data store 150. The server 150 and computing device 170 may include various components, including those shown in FIG. 6-7 and/or further discussed below. In embodiments, computing device 170 may comprise an MDT mounted within vehicle 120.

While single instances of devices are shown in FIG. 1, embodiments according to various aspects of the present disclosure may include those in which multiple instances of devices are provided, including multiple vehicles 120 or multiple cameras 110 or multiple mobile communications devices 125. Systems according to various embodiments according to various aspects of the present disclosure may also include different sets of these devices. Although camera 110 is provided as an example of a recording device and audio/visual data as an example of recorded data, recording devices are not limited to video cameras and recorded data is not limited to audio/visual data (e.g., information).

Figure 2:
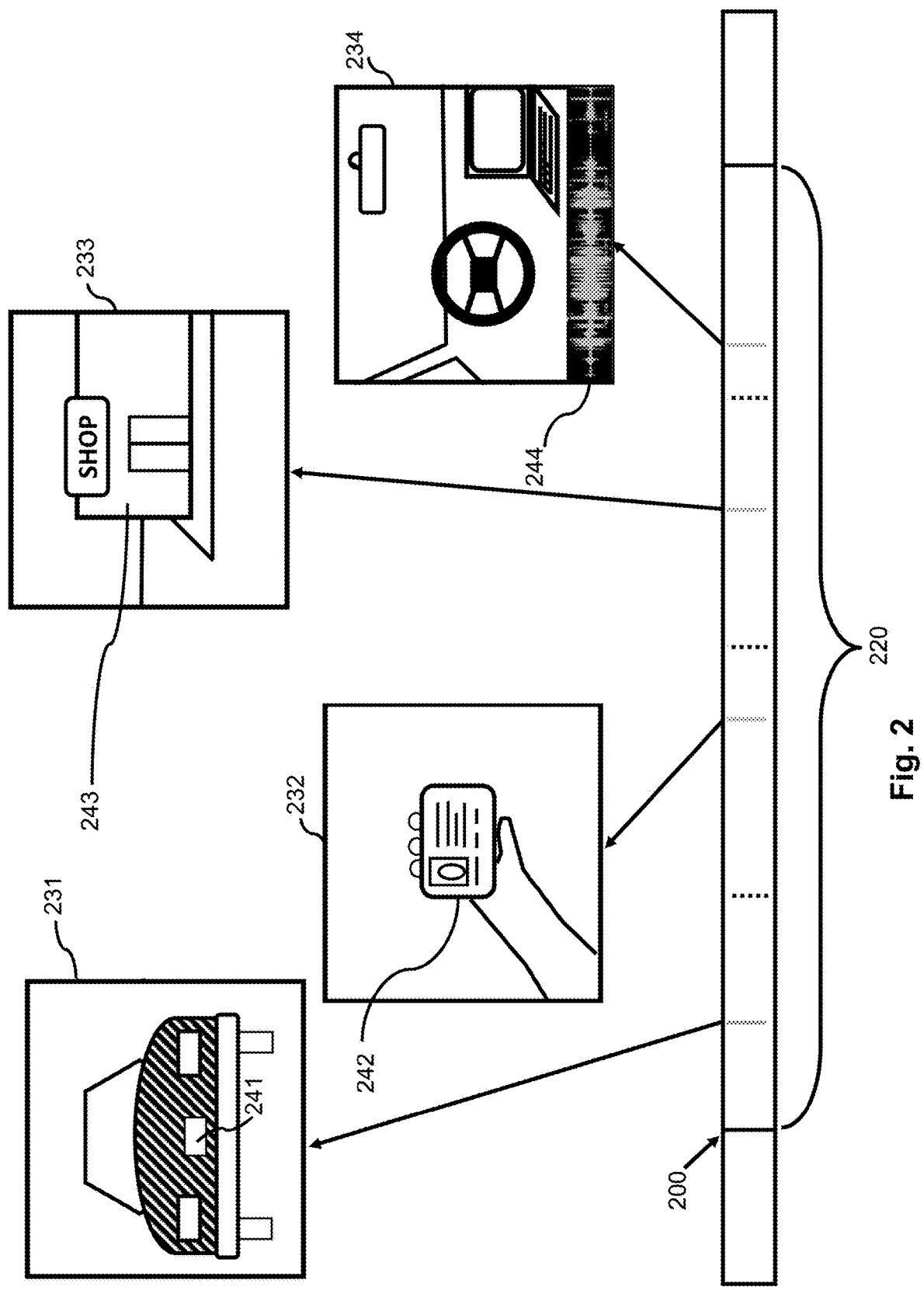
FIG. 2 is a diagram illustrating example content recorded at an incident in audiovisual data according to various aspects of the present disclosure.

FIG. 2 is a diagram illustrating example content recorded at an incident in audiovisual data according to various aspects of the present disclosure. The audiovisual data is included in a media file 200. Audiovisual data 220 is included in media file 200. Audiovisual data includes video data and audio data recorded by a single recording device. The video data includes image data for each of a plurality of frames. For example, audiovisual data 220 includes frames 231-234 of video data, each frame 231-234 associated with an individual set of image data. Frame 234 also includes audio data 244 that was captured concurrently with video data while a recording device source of file 200 was positioned inside a vehicle. Audio data may be captured with other frames 231-233 as well in embodiments according to various aspects of the present disclosure.

Frames 231-234 each include unstructured data that may be associated with one or more sets of data for a report.

Frame 231 includes image data representing a vehicle with a license plate 241 corresponding to a vehicle entity. Frame 232 includes image data representing an identification document (e.g., driver's license, passport, etc.) that may correspond to a person entity for the report. Frame 233 includes image data representing a building that may correspond to a property entity. Frame 234 includes audio data 244 corresponding to a narrative dictated by a user inside a vehicle. As shown, file 200 includes multiple sets of unstructured data. For example, a first unstructured data may include frames 231-234. A second unstructured data may include audio data associated with each frame, including the narrative audio data 244.

Figure 3:
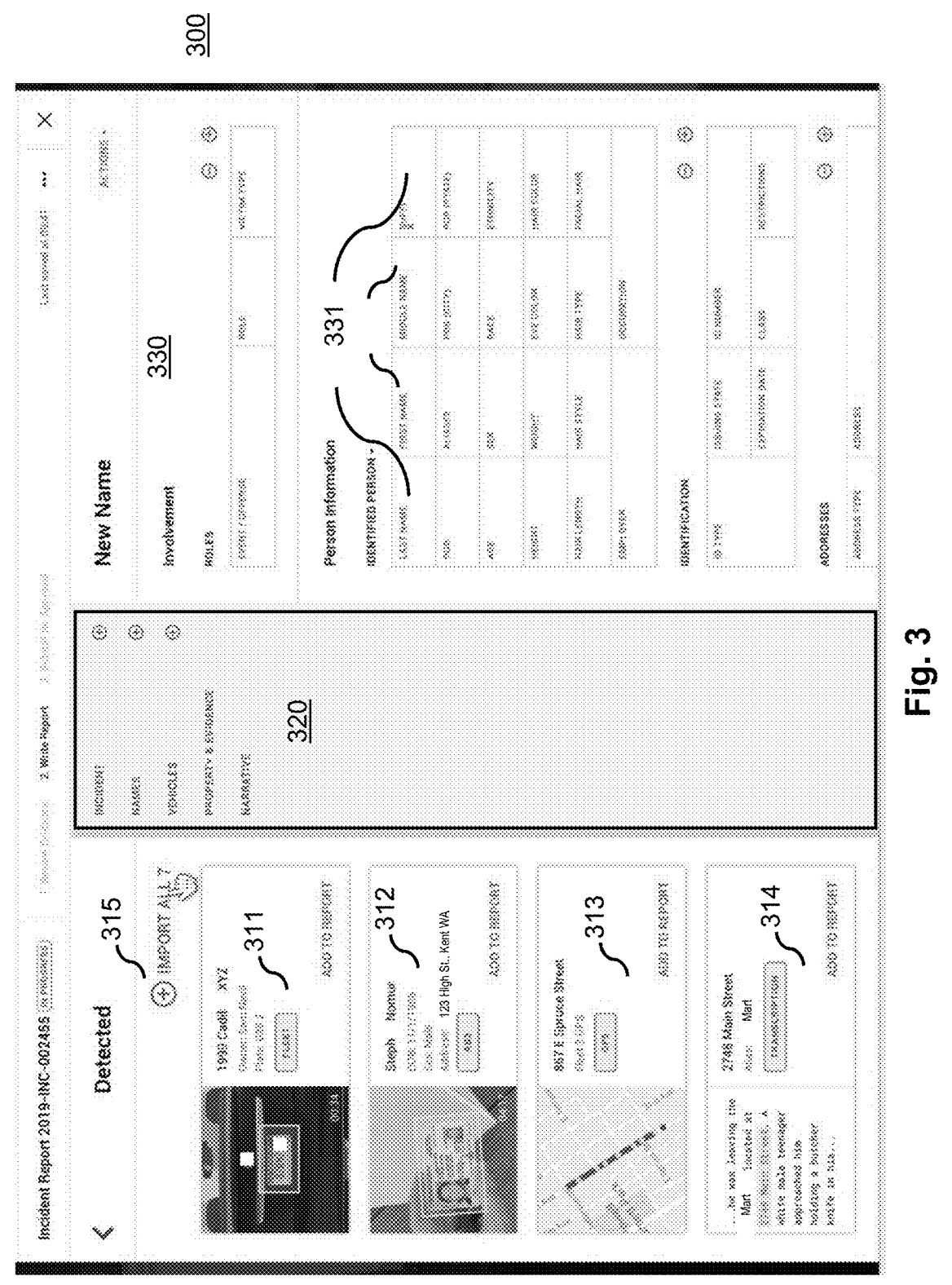

FIG. 3 illustrates an exemplary interface for generating structured reports according to various aspects of the present disclosure. Interface 300 provides detected reference segments 311-314, a selection input element 315, a structured report index 320, and a template 330 that includes blank, predetermined fields 331. Each of these elements is displayed in a separate region (e.g., pane, panel, portion, etc.) of a window of a browser. Interface 300 may correspond to a single structured report.

Detected reference segments 311-314 are detected from unstructured data. A reference segment may include electronic information that may be associated with a specific portion of a report. For example, a reference segment may be specifically associated with an entity (e.g., person, vehicle, other property) that may be included in a report. A reference segment may also include a location for an incident type. A reference segment may include audio data or text data for a narrative. A reference segment may be employed to complete one or more portions of a structured report. Each reference segment may be detected from different sets of unstructured data from different sources and used to populate a report. For example, segments 311-314 may be detected from one or more media files, such as file 200.

Segment 311 is associated with image data in which a license plate is represented. A license plate number and type of vehicle (e.g., make, model, etc.) have been determined as part of the detection process. A portion (e.g., subset) of image data is shown in the segment 311, along with data determined from the image data as part of the detection process.

Segment 312 is associated with image data in which an identification document is represented. A name of a person associated with the document has been determined as part of the detection process. A portion (e.g., subset) of image data is shown in the segment 312, along with data determined from the image data as part of the detection process. Segments 311 and 312 may be determined from a same unstructured data (e.g., same video data) or different sets of unstructured data. For example, with brief reference to FIG. 1, segment 311 may be detected from recorded data captured by vehicle 125 and segment 312 may be detected from recorded data captured by camera 110.

Segment 313 is associated with position data in which a position of a vehicle is represented. An address may be determined based on a position data of a vehicle. For example, determining segment 313 may include determining an address based on global position data of a vehicle. A portion (e.g., subset) of map data is shown in the segment 313, illustrating both a global position and associated address determined from the position data. Segment 313 may, for example, be detected in recorded data captured by vehicle 125.

Segment 314 is associated with audio data in which an address is represented. A text-based version of the address may be determined as part of the detection process. The audio data may be transcribed and text associated with an address may be detected within the transcribed text for the audio data. A portion (e.g., subset) of text data associated the audio data is shown in the segment 314, along with address determined from the transcribed audio data as part of the detection process.

Each segment 311-314 also provides a source recording device (e.g., body camera, vehicle sensor, etc.) of each detected segment. Detecting a segment, such as each of segments 311-314, may include identifying a subset or portion of unstructured data, creating the segment from the subset of unstructured data, and including metadata for the segment identifying a source of the unstructured data from which the segment was created. In embodiments, a segment may include one or more of a copy of the subset of the unstructured data or information identifying the subset of unstructured data.

In embodiments, detecting a segment may include determining text data associated with recorded data. The recorded data may be non-text data. The recorded data may be audiovisual data, audio data, or video data. Determining the text data may include processing a detected segment to generate the text data. In embodiments, the processing may include one or more of transcription and optical character recognition of the recorded data. The determined text data may be included as secondary data for a segment. The determined text data may be displayed with a segment. For example, segment 311 may include text data determined by applying optical character recognition processing to recorded data in which a license plate is detected. The text data for segment 311 may correspond to the characters of the license plate generated (e.g., recognized) by the processing applied to the recorded data in which the license plate was detected. The characters may be stored in secondary data for segment 311 and further displayed with segment 311 in interface 300.

In embodiments, a segment may include a portion of recorded data and secondary data. The portion of recorded data may be captured and the secondary data may be detected and/or determined prior to display of the segment in an interface for generating a report. The recorded data and secondary data may be recorded or generated prior to and/or independent of being included in a report. For example, segment 312 may be detected and secondary data may be determined prior to display on interface 300 and independent of whether segment 312 is further included in index 320. In embodiments, a segment such as segment 312 may be detected, but not included in index 320, such that segment 312 is not imported or otherwise represented in a report generated via interface 300.

Each segment 311-314 may correspond to structured data in video data (e.g., footage) from a source recording device (e.g., a body camera, etc.). Each segment 311-314 may be extracted via computer vision and presented in user interface 300 during report writing, such that each segment 311-314 is available to add to the structured report with a single input (e.g., one click, one input from a keyboard, single actuation of a user interface device, etc.). Such segments may be from different source recording devices, enabling a user (e.g., law enforcement officer) associated with each recording device to contribute segments for generating of a report by another user.

Selection input element 315 enables an input to be received associated with one or more reference segments 311-314. After display of segments 311-314, an input may be received via 315 to import one or more reference segments, including segments 311-314, into a structured report. Generating a report may include importing a detected reference segment upon receipt of an input signal via a user interface such as via input element 315. In embodiments, alternate or additional selection input elements may be provided, including those associated with an individual segment by which the single, individual segment may be added to a report upon receipt of an input via the selection input element for the individual segment.

A structured report index 320 includes a logical reference to each type of data associated with the report. Structured report 320 index may include a predetermined data structure to which links (e.g., hyperlinks), content, or other information associated with one or more detected segments 311-314 may be electronically associated (e.g., linked, copied, etc.). As shown via interface 300 and index 320, the structured report in the example of FIG. 3 does not yet include data associated with an incident type, entity, or narrative.

In embodiments, structured report index 320 may include links to each set of data in the structured report. As shown in FIG. 3, the report may include data associated with an incident or incident type, a person entity by name, a vehicle entity, a property entity, an evidence entity, and a narrative. By selecting one or more sets of data in index 320, a template may be displayed.

Template 330 is a template for a person entity. Template 330 includes blank fields 331. Blank fields 331 define a predetermined format for data for an entity or other set of data in a report. Each field 331 of a template may receive data associated with entity or other portion of a report. Generating a structured report may include pre-filling one or more fields 331. Generating a structured report may include populating one or more fields 331. A copy of detected or determined data associated with a reference segment may be imported to a blank field as part of generating a structured report. A single received input may cause a plurality of different fields of different portions of a structured report to be populated with detected or determined data associated with one or more sets of unstructured data. In embodiments, template 330 may correspond to a form for a structured report. The form may include a copy of template 330.

Figure 4:
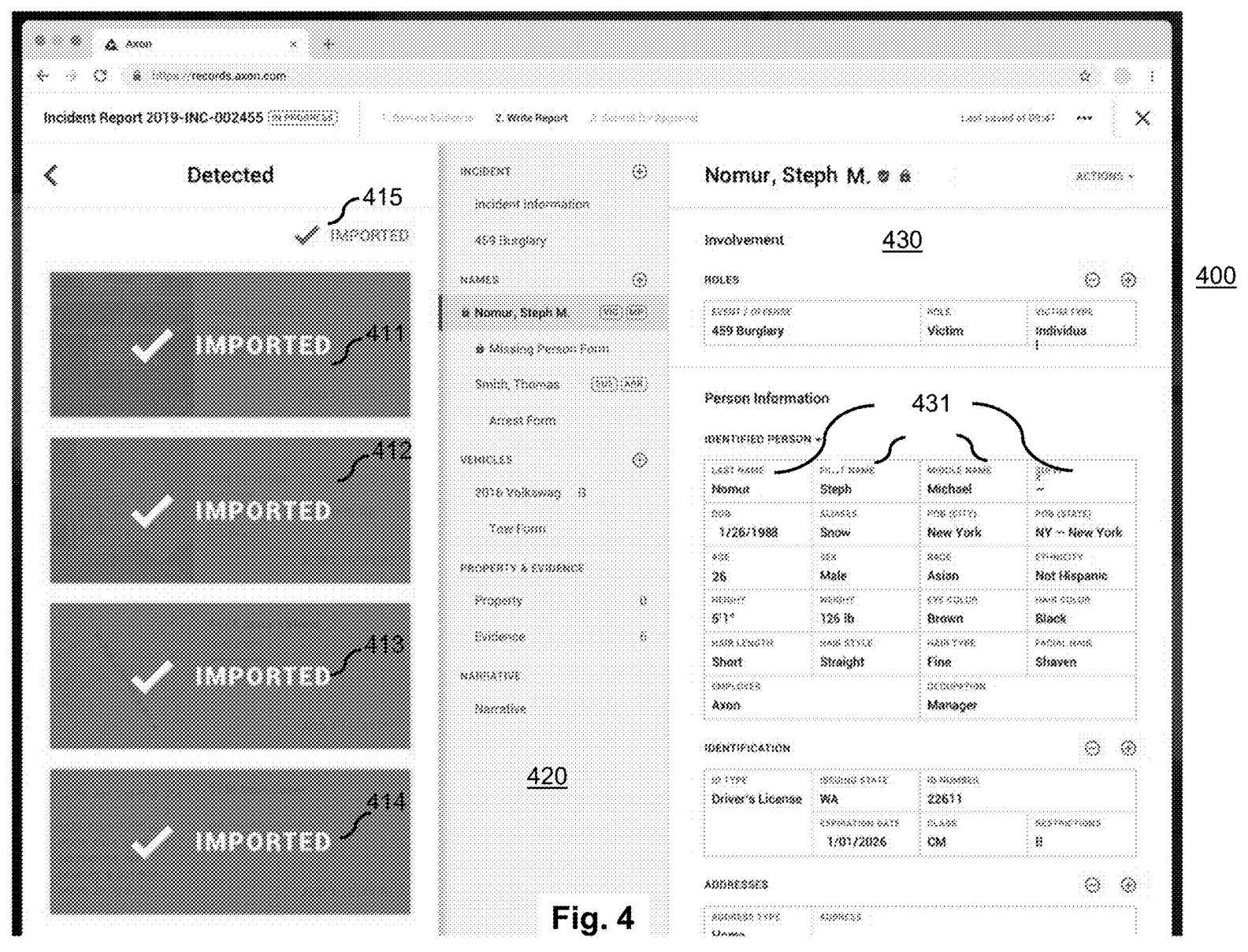

FIG. 4 illustrates an exemplary interface for generating structured reports according to various aspects of the present disclosure. In embodiments, interface 400 corresponds to interface 300 after an import. For example, segment 411 may correspond to segment 311 after import, segment 412 may correspond to segment 312 after import, segment 413 may correspond to segment 313 after import, and segment 414 may correspond to segment 314 after import. Interface 400 shows detected reference segments 411-414 after import, a selection input element 415 after import, a structured report index 420, and a template 430 that includes fields 431. Each of these elements is displayed in a separate region (e.g., pane, panel, etc.) of a window of a browser. Interface 400 corresponds to a single structured report.

As shown, each of detected segments 411-414 have been imported. Visual indication of this import, as part of the structured report generation process, may be provided, as shown. A change in import status of a segment may be indicated by a change in one or more of a color, text, or other visual representation of the segment relative to prior to import of the segment. Segment 411 has been imported into a vehicle entity part of a structured report accessible via index 420. Segment 412 has been imported into a person entity part of the structured report accessible via index 420. Segment 413 has been imported into an incident type of a structured report accessible via index 420. Segment 414 has been imported into a property entity of the structured report accessible via index 420.

After import, no additional unstructured data may be extracted based on each reference segment. Import of a segment may cause all data of a segment to be linked or otherwise included in a record. While segments 411-414 have all been imported in the example of FIG. 4, not all displayed segments need to be imported according to various aspects of the present disclosure. For example, one or more reference segments may not be imported and remain on display in an interface such as interface 400. Unimported segments may remain unlinked or otherwise unassociated with a given report. By displaying segments that remain unimported, embodiments according to various aspects of the present disclosure may ensure a range of potential entities and other parts of a report have been presented for inclusion in report, improving a completeness and/or accuracy of the report.

In embodiments, indication that one or more segments have been imported may be presented on interface 400. For example, selection input element 415 illustrates that all detected segments have been successfully imported. In other embodiments, input element 415 may enable one or more other, non-imported reference segments to also be imported.

In embodiments, importing a segment may cause unstructured data associated with the segment to be linked to a report. For example, a link to the unstructured data may be added to structured report data. Alternately or additionally, structured report data may include a copy of the unstructured data. In embodiments, one or more unstructured data may be selected for inclusion in a structured report via a part or element of the structured report associated with attachments. The unstructured data may be selected as an attachment in this part or element of the report.

Template 430 includes fields 431 that have been filled-in or populated or otherwise completed with data detected from and/or determined based on unstructured data. Template 430 has been populated with data from reference segment 412, which corresponded to a person entity for the report. A name, date of birth and other information has been detected or determined from segment 412. Fields 431 that have been completed may include copies or links to data from an imported segment. In embodiments, template 430 is a form selected in accordance with reference segment 412.

In embodiments, the data in fields 431 may be detected directly from unstructured data (e.g., via OCR of image data, transcription of audio data, detection of a color, etc.). The detected data in fields 431 may include data detected during detection of a segment, such as segment 411. The detected data in fields 431 may also include additional data from unstructured data associated with an imported segment that is detected after the segment is imported. For example, segment 411 may have detected data or information associated with a license plate number, make, and model of a vehicle. After segment 411 is selected for import, additional processing of the unstructured data of segment 411 may be further processed to detect additional data, including one or more of vehicle color, model year, trim level, and body style for completing one or more fields 431 of a report. Such additional data are non-limiting examples; embodiments according to various aspects of the present disclosure may detect additional or fewer data in accordance with a configuration of a report, an agency policy, and entity type, and/or other factors.

In embodiments, multiple users associated with different user accounts may collaborate on the generation of a single report. For example, multiple different users at different computing devices (e.g., computing device 170) may select segments for import via input element 415. Different users may also review templates such as template 430 to confirm accuracy and/or provide supplementary information one or more portions of a structured report.

In other embodiments, data for one or more predetermined fields may be determined indirectly from unstructured data. For example, an identification document number may enable a request to be transmitted to an identification document database to retrieve additional data that may not be represented in image data for the document. For example, a current home address may be retrieved from such a database to verify and/or correct information displayed on a document, thereby enabling the structured report to include accurate data.

Other databases may be queried based on unstructured data as well. For example, a list of other structured reports associated with a person entity may be retrieved based on information included unstructured data. As another example, database containing employee information may be queried based on one or more segments of unstructured data as well. Such additional or secondary information may also be provided in one or more predetermined fields for an entity or other part of a structured report.

Figure 5:
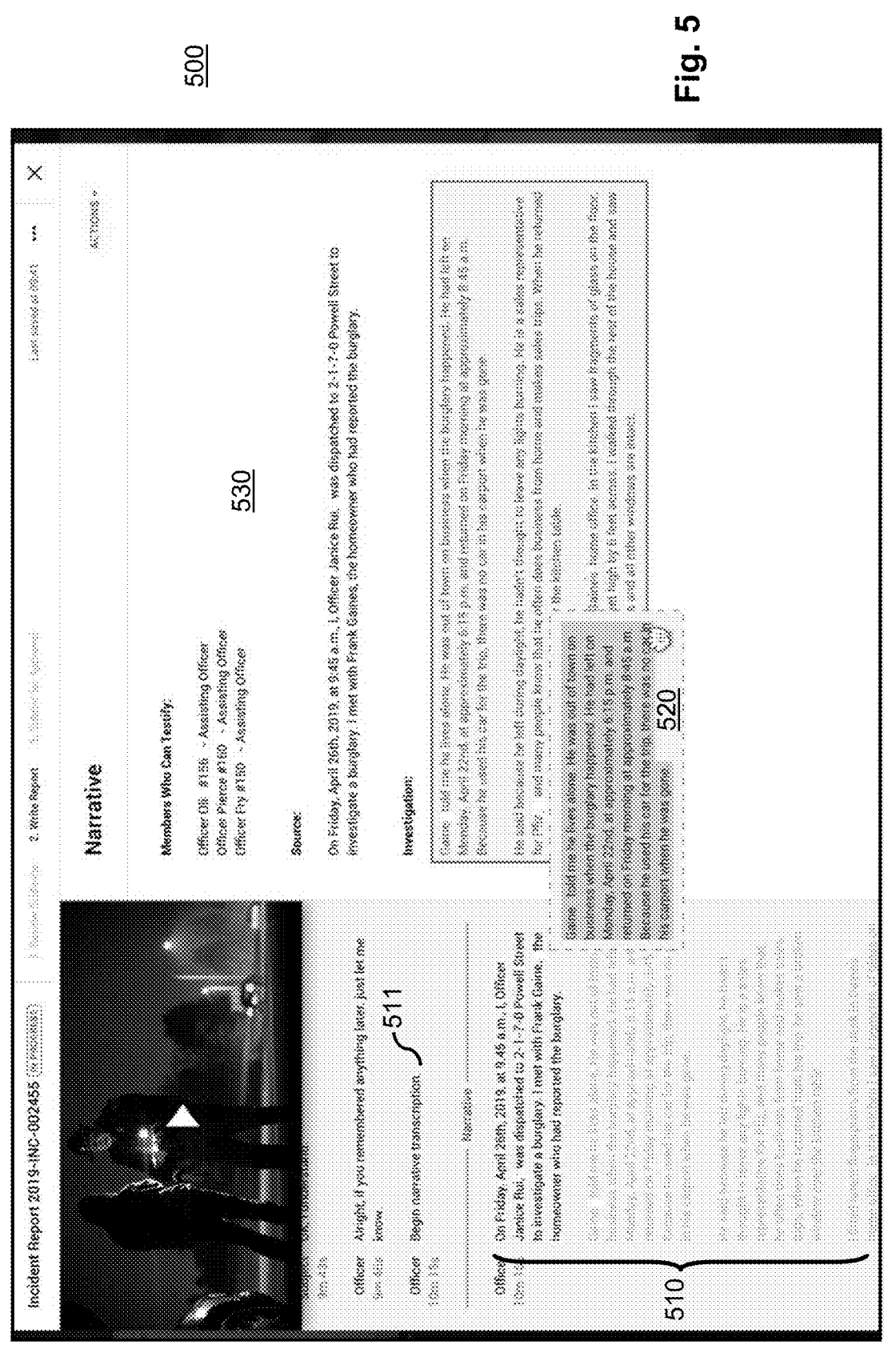

FIG. 5 illustrates an exemplary web interface for generating structured reports according to various aspects of the present disclosure. Interface 500 includes a reference segment 510, predetermined keywords 511, an input 520, and a narrative template 530.

In embodiments, text from a video shows up in a drawer (or other user experience [UX] affordance) while a user (e.g., an officer) is writing a structured report. The interface makes it easy to select (e.g., copy and paste, drag-and-drop, etc.) critical snippets. In embodiments, one or more sentences, paragraphs, or other portions of a reference segment may be simply selected (e.g., clicked on) to cause the selected portion to simply show up in a narrative of a structured report so a user doesn't need to copy/paste or provide another of multi-part input.

In embodiments, if an officer narrates to a recording device (e.g., body camera, etc.), using a specific script or other predetermined pattern of keywords or audible input, one or more sets of data in a structured report may be automatically populated (e.g., pre-filled) without or independent of additional user input.

Reference segment 510 is associated with a narrative portion of a structured report. Reference segment 510 includes detected text data associated that has been transcribed from audio data. For example, reference segment 510 may include transcribed audio data from frame 234 with brief reference to FIG. 2. Reference segment 510 has been detected based on keywords 511. Keywords 511, when included in audio data, enable subsequent audio data to be detected as a reference segment for a narrative of an unstructured report. Detecting segment 510 from unstructured data may include detecting audio keywords 511 and indicating a set of audio data adjacent (e.g., before, after, between) keywords 511 as a segment available for further import into structured data of a report. Keywords 511 may correspond to a script. While only one set of keywords 511 is shown, other embodiments according to various aspects of the present disclosure may include multiple different sets of keywords, each detected to associated different sets of unstructured audio with one or more predetermined portions of a structured report. For example, keywords may indicate that subsequent or preceding audio data relative to audio data for the keywords should be imported into one or more predetermined sets of data for a structured report. For example, one or more first keywords may associate unstructured data with an entity, while one or more second keywords may associate unstructured data with a narrative, while one or more third keywords may associate unstructured data with an incident type of a structured report. In embodiments, keywords 511 may include a single keyword. In embodiments, keywords 511 may include an end keyword detectable and indicative of an end of a segment to be subsequently detected. In embodiments, presence of one or more keywords 511 may indicate that audio data of corresponding unstructured data should be transcribed, such that text data is automatically generated for a segment.

Selection input 520 of one or more portions of reference segment 510 import the selected portions into a narrative template 430. Narrative template 430 includes a predetermined data structure with fields for each of one or more of person who can testify, a source of an incident response, and a description of the incident. Based on a received input 520, one or more portions of segment 510 are copied into a description field of template 530. One or more additional selection inputs may import one or more reference segments or portions thereof into other fields of template 530 as well. Based on selection input 520, structured data may be transferred to a structured report without a need for manual input of such information. In embodiments, one or more fields of a template may alternately or additional receive data from a user interface. In such embodiments, a time necessary to generate such information may yet be reduced based on the structured data that was extracted from one or more recording devices.

Figure 6:
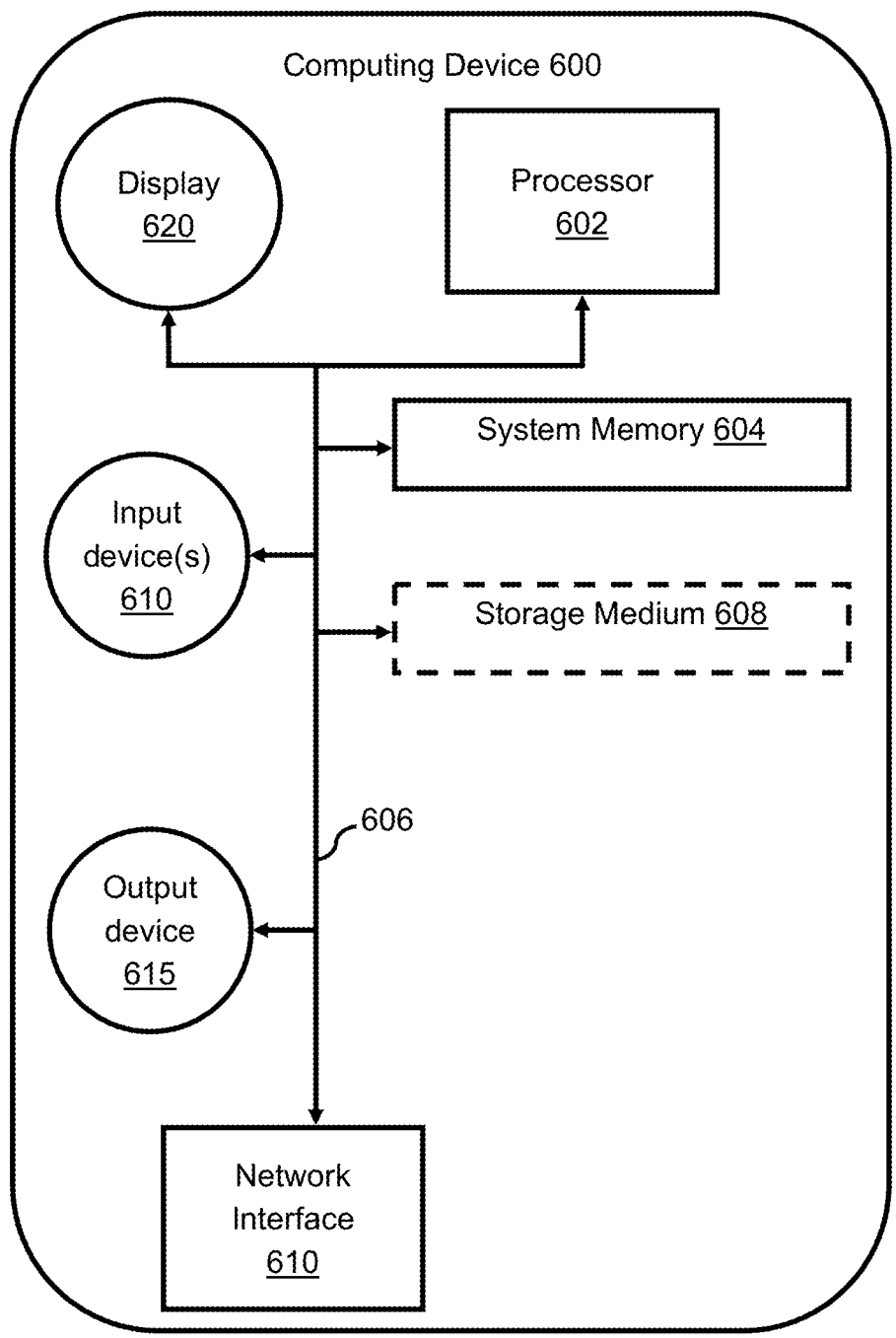
FIG. 6 is a block diagram of an implementation of mobile computing device according to various aspects of the present disclosure.

FIG. 6 is a block diagram of an implementation of computing device according to various aspects of the present disclosure. For example, computing device 600 may correspond to each of one or more of camera 110, MDT in vehicle 125, and computing device 170 as shown in FIG. 1. While multiple different types of computing devices are discussed above, the exemplary computing device 600 describes various elements that are common to many different types of computing devices. While FIG. 6 is described with reference to a computing device that is implemented as a device on a network, the description below is applicable to servers, personal computers, mobile phones, smart phones, tablet computers, mobile computing devices, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, LTE, WiMAX, Bluetooth, and/or the like. As will be appreciated by one of ordinary skill in the art, the network interface 610 illustrated in FIG. 6 may represent one or more wireless interfaces or physical communication interfaces described above with respect to particular components of the device 600.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and nonvolatile and removable and non-removable media implemented in any method or technology capable of storing information, such as computer readable instructions, data structures, program modules, or other data. In this regard, the system memory 604 and storage medium 608 depicted in FIG. 6 are merely examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include one or more input devices 610, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 800 may also include one or more output devices 615 such as a display 620, speakers, printer, etc. An interface, such as shown in FIGS. 3-5 or FIGS. 10-15, may be displayed on display 620 and input associated with displayed segments, unstructured data or a structured report may be received via the one or more input devices 610. Since these devices are well known in the art, they are not illustrated or described further herein.

Figure 7:
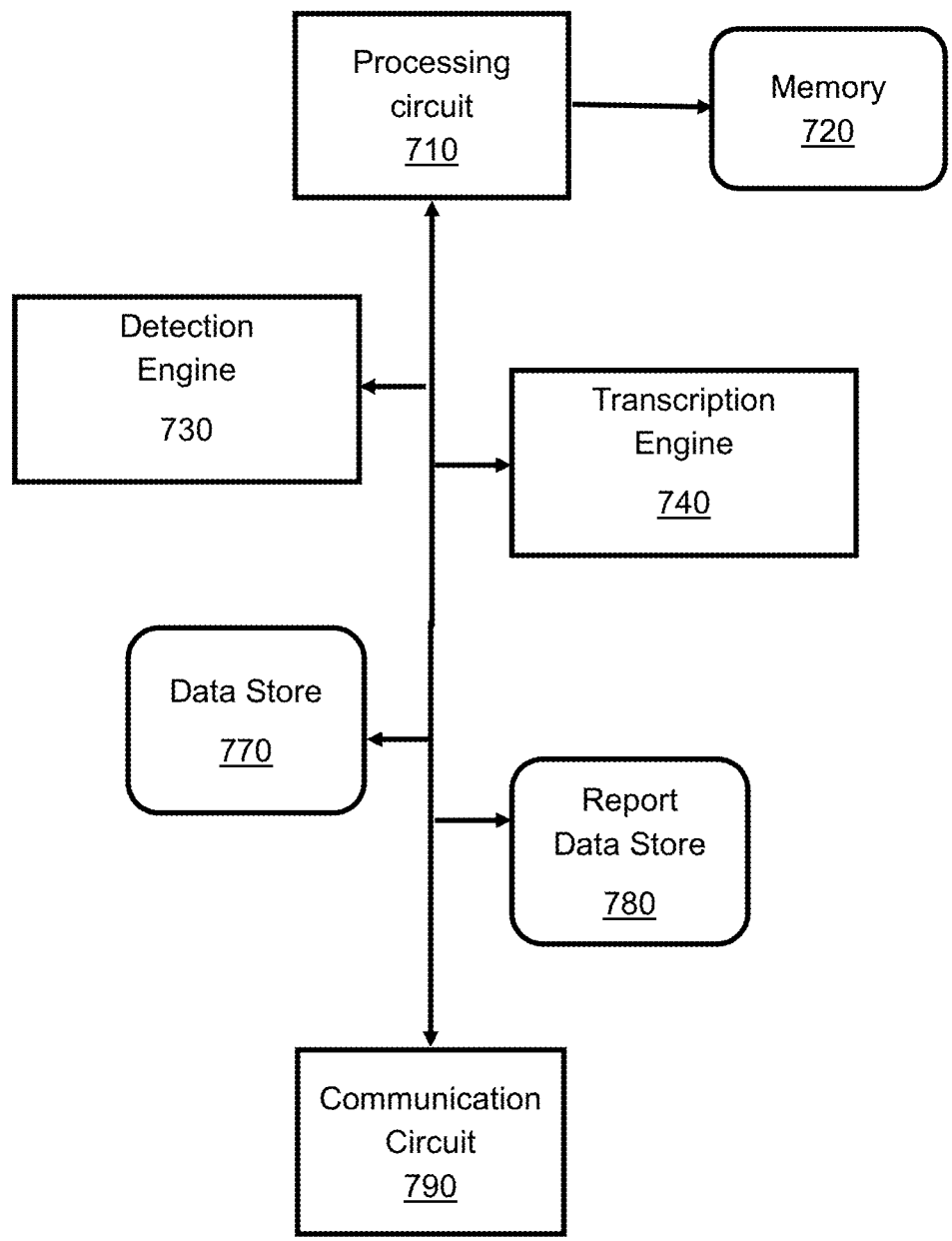
FIG. 7 is a block diagram of an implementation of a records management system according to various aspects of the present disclosure.

FIG. 7 is a block diagram of an implementation of a records management system according to various aspects of the present disclosure. System 700 may include one or more computing devices. For example, system 700 may comprise one or more servers (e.g., server 160) and one or data stores (e.g., 150). System 700 may perform functions of a records management system. A records management system may include a dedicated system for storing electronic information related to incidents. The records may be law enforcement records. The records may include structured reports. In embodiments, an evidence system receives recorded data including unstructured data, stores recorded data, analyzes recorded data to detect reference segments in recorded data, generates structured reports, and/or stores structured reports.

Device 700 includes processing circuit 710, memory 720, detection engine 730, transcription engine 740, recorded data store 770, report data store 780, and communication circuit 790.

Data store 770 stores recorded data. System 700 may receive recorded data via communication circuit 790. The recorded data may include unstructured data. For example, the recorded data store may receive audio data, video data, image data, and/or position data. The recorded data may be received from one or more recording devices. The recorded data may be uploaded from a recording device. The recorded data may be included in a media file. Data store 770 may also transmit recorded data via communication circuit 790.

Data store 780 stores structured report data. The data may include one or more sets of logically structured data associated with a structured report. The data may include data imported from unstructured data initially or previously stored in data store 770. The data may include data detected or determined to be associated with one or more reference segments by engine 730. The data in data store 780 may include structured data, specifically associated with one or more sets of data in a structured report. In embodiments, the structured reports may link to one or more sets of unstructured data in data store 770 from which structured data was imported, thereby allowing a source of data in a report to be reviewed. In other embodiments, one or more sets of unstructured data that are associated with a report may be copied or otherwise transferred to store 780 to allow a source of data to be traced and/or viewed in full. Data store 780 may also transmit recorded data via communication circuit 790. For example, data associated with one or more of a detected reference segment and a structured report may be transmitted via circuit 790 from data store 780.

Detection engine 730 detects one or more reference segments in unstructured data. Detection engine 730 may include one or more object detection engines executable on a set of unstructured data. Each object detection engine may be trained (pre-programmed, tuned, configured, etc.) to detect one or more predetermined objects represented in unstructured data. Multiple object detection engines may be trained to detect different objects (e.g., license plates, identification documents, weapons, etc.).

Detection engine 730 may also detect one or more descriptors (e.g., name, address, location, physical appearance descriptors, etc.) associated with an entity represented in unstructured data. For example, detection engine may detect text data corresponding to an address or a name in transcribed audio data. The engine 730 may also perform optical character recognition on one or more portions of image data to detect one or more descriptors associated with an entity represented therein. Engine 730 may further detect one or more street addresses associated with global positioning system (GPS) data.

Detection engine 730 may also detect one or more predetermined keywords. For example, engine 730 may detect one or more keywords associated with a script. Engine 730 may detect one or more predetermined keywords associated with a type of reference segment, such as a segment to be associated with a narrative of a structured report.

Detection engine 730 may output data associated with a reference segment. For example, engine 730 may generate an output indicating a location of an object represented in image data. Engine 730 may generate an output indicating a position in text data associated with a reference segment. Engine 730 may generate an output indicating a timestamp in audio data associated with a reference segment. The output data may be generated by the detection engine, conveying information from unstructured data in a new and/or different type data relative to the unstructured data from which the output data is generated. For example, output data may include text data reflecting content of unstructured data comprising one or more of text data, video data, and audio data.

In embodiments, the detection engine 730 may implement one or more deep learning networks to received unstructured data. A deep learning network may be a neural network. The detection engine 730 may provide object detection, including real-time object detection. The object detection neural network may implement various approaches, such as YOLO or YOLO v2. The selected deep learning technique may automatically generalize unique features of predetermined objects. Such predetermined features, if detected by the engine 730, may collectively result in a reference segment being detected for a corresponding set of unstructured data.

Transcription engine 740 may transcribe audio data. For example, engine 740 may receive unstructured data comprising audio data from one or more of communication circuit 790, data store 770, or detection engine 730 and generate text data associated with the audio data. The text data may be returned to a source of the audio data for storage and/or further processing of the text and/or audio data.

In embodiments, transcription engine 740 may further provide the audio data to detection engine 730, wherein detection engine 730 may further detect a subset of the audio data as associated with an entity (e.g., proper name, nickname) or incident type (e.g., location) and generate a reference segment in accordance with the detected subset.

In embodiments, engines 730 and 740 may be combined into a same engine or further divided into multiple engines, each engine configured to generate a predetermined output in accordance with applying predetermined detection processing on an unstructured data. The same engine or multiple engines may automatically process unstructured data upon upload of the unstructured data to a data store, such as data store 770.

Processing circuit 710 may control and/or coordinate the operation of detection engine 730, transcription engine 740, recorded data store 770, report data store 780, and communication circuit 790. Processing circuit 710 may perform some or all of the functions of engines 730 and 740.

Memory 720 may store programs executed by processing circuit 710. The stored programs stored in memory 720, when executed, may perform some or all of the functions of system 700 or any portion thereof. In embodiments, memory 720 may perform some or all of the functions of data stores 770 and 780.

The term "engine" as used herein refers to, in general, circuitry, logic embodied in hardware and/or software instructions executable by a processing circuit. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Software instructions for execution by a processing circuit may be written in any programming language, including but not limited to C, C++, COBOL, JAVA™, Python, PHP, Perl, HTML, CSS, JavaScript, VBScript, ASPX, HDL, and/or Microsoft .NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as software for execution by a processing circuit may be stored in any type of computer-readable medium. An engine may be stored on and executed by one or more general purpose computers, thus creating a special purpose computer configured to perform the functions of (e.g., provide by) the engine.

A system may include one or more processing circuits configured to perform the functions of the illustrated engines, though the processing circuit that performs the functions of an engine may not be expressly shown.

As understood by one of ordinary skill in the art, a "data store" as described herein may be any suitable device configured to store data for access by a processing circuit. A data store receives data. A data store retains (e.g., stores) data. A data store retrieves data. A data store provides data for use by a system, a processing circuit, and/or an engine. A data store may organize data for storage. A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database. Data in a data store may be stored in a computer-readable medium. A data store may be integrated with another system. For example, data store 770 is integrated with system 700 as shown in FIG. 7. A data store may also be directly accessible via a network, such as data store 150 accessible via network 140 in FIG. 1.

Redaction data store 780 and data store 770 perform the functions of a data store. A data store may be implemented using any computer-readable medium (e.g., memory). An engine (e.g., transcription engine 740 or detection engine 730) or processing circuit 710 may access a data store locally (e.g., via a data bus), over a network, and/or as a cloud-based service. For example, structured report data store 780 may be provided at a network location, such as data store 150 via network, rather than integrated within system 700.

As further illustrated in FIG. 7, the system 700 may include a communication circuit 790 comprising one or more components for communicating with other devices over a network. Embodiments of the present disclosure may access basic services that utilize the communication circuit 790 to perform communications using common network protocols. The communication circuit 790 may also include a wireless network interface configured to communicate via one or more wireless communication protocols, such as WiFi, 2G, 3G, LTE, WiMAX, Bluetooth, and/or the like. As will be appreciated by one of ordinary skill in the art, the communication circuit 790 illustrated in FIG. 7 may represent one or more wireless interfaces or physical communication interfaces described above. Communication circuit

790 may be controlled by processing circuit to transmit one or more detected reference segments, structured reports, and other related data to another computing device, such as device 600. Communication circuit 790 may be controlled by processing circuit to receive one or more sets of unstructured data, selection inputs, and other related data from another computing device, such as device 600. For example, a selection of an input to import one or more reference segments for a structured report may be received via circuit 790.

Figure 8:
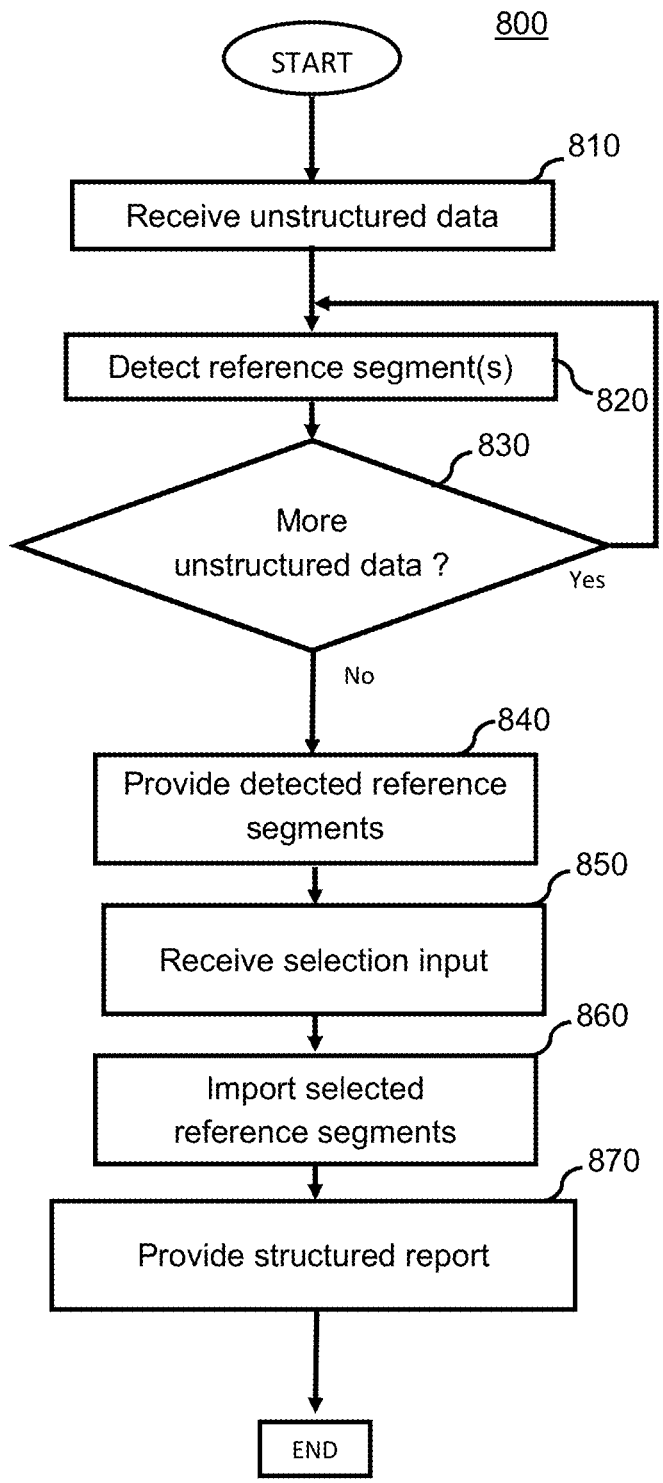
FIG. 8 is a diagram of a method of generating a structured report according to various aspects of the present disclosure.

FIG. 8 is a diagram of a method of generating a structured report according to various aspects of the present disclosure. Method 800 may be performed by a computing device or one or more computing devices. In embodiments, method 800 may be performed by a records management system 700. Method 800 may be performed based on one or more unstructured data and/or input received from another device, such as one or more recording devices or a computing device such as device 600. In embodiments, method 800 may be performed by a combination of computing devices, such as one or more of each of computing device 600 and system 700.

At block 810, unstructured data may be received. Unstructured data may include one or more of audio data, video data, image data, position data, or text data. In embodiments, different sets of such unstructured data may received. Unstructured data may include audio in audio data. Unstructured data may include an image in image data. Unstructured data may be included in a media file. A media file may include one or more sets of unstructured data. Unstructured data may comprise a sequence of images or frames in video data. Data may be received in accordance with one or more streaming protocols. In embodiments, detection of one or more reference segments in unstructured data may be initiated while the same unstructured data is being received via a streaming input.

Each type of received data may include data that is unstructured with respect to the content of the data. For example, the received data may be one or more of not classified, not labeled, not indexed, etc. Content of unstructured data may not be represented by other data. For example, content of unstructured data in a media file may not have associated metadata describing content of the media file that exists when the media file is received. Unstructured data may lack descriptive information that is generated using content of the received data itself.

Context for a set of unstructured data differs from content of unstructured data. Context may reflect external factors or properties for an environment or situation in which the data was recorded. Information regarding context may be stored in metadata for a set of unstructured data, separate from information corresponding to content of the set of unstructured data. Context may include data about the recording process for the unstructured data, such as when unstructured data was initially recorded (start time) and when recording stopped (stop time). Other contextual metadata may include a location of the recording device that recorded the unstructured data, a type of recording device that recorded the media file, or a resolution of the media file. In embodiments, contextual metadata may include one more indicators of one or more beacon signals emitted by another recording device proximate to a recording device that captured the unstructured data. Such metadata pertains to the recording process itself—the context in which the media file was recorded. This context data may be added to data from a user, such as via a recording device, rather than being generated automatically and directly from content of the received data itself.

In contrast, content may be indicated (represented, identifiable, indexable, etc.) from unstructured data itself. Content may include data captured by one or more sensors of a recording device during a recording. Content may be captured by one or more of an image sensor configured to capture image data, a video sensor configured to capture video data, a position sensor configured to capture a position of a recording device, and an audio sensor configured to capture audio data. In embodiments, unstructured data includes content data originally captured by a sensor and recorded on a recording device.

A reference segment may include a portion (e.g., part, subset, less than all, etc.) of unstructured data. A reference segment may be detected in unstructured data. For example, a reference segment may include one or more pixels that represent an identification document in image data. Alternately or additionally, a reference segment may include one or more images of video data and/or one or more sequences of audio data.

At block 820, reference segments may be detected. Detecting a reference segment may include transcribing the first unstructured data. Detecting a reference segment may include identifying image data representing one or more predetermined objects. Detecting a reference segment may include detecting image data representing a license plate. Detecting a reference segment may include detecting image data representing an identification document. Detecting a reference segment may include detecting image data representing a building. Detecting a reference segment may include detecting unstructured data of a name of a person. Detecting a reference segment may include detecting unstructured data of a physical address. Detecting a reference segment may include detecting one or more of a name and an address from audio data. Detecting a reference segment may include detecting an incident type from the unstructured data.

In embodiments, detecting the one or more reference segments may include detecting the reference segment based on an incident type. For example, an incident type associated with an auto-burglary may be used by a detection engine to detect one or more license plates in unstructured data, as such an incident type may indicate that a vehicle is involved with an incident represented by the structured report. As another example, an incident type of assault may be used to detect one or more weapons in unstructured data.

Detecting a reference segment may also include detecting a predetermined pattern in the first unstructured data, such as a pattern associated with one or more keywords and/or a predetermined script. Detecting a reference segment may also include detecting a reference segment associated with responder narration of an event. The narration may be detected based on audio data. The narration may be detected based on transcribed audio data. Detecting a reference segment may include applying one or more object detection engines to unstructured data. Detecting a reference segment may include isolating the reference segment from the unstructured data.

Detecting a reference segment may include determining secondary data associated with a reference segment. In embodiments, detecting the reference segment may include generating the secondary data. The determined secondary data may be associated with content in the unstructured data with which the reference segment is associated. Detecting the reference segment may include data created as a result of the detection.

Secondary data may include extracted data. For example, text data associated with image data may be extracted by applying an optical character recognition to a reference segment. Text data may also be extracted via transcription of audio data and detecting one or more words in the extracted text data. Secondary data may be extracted as structured data from the reference segment. Text data may be extracted from image data. Text data may be extracted from audio data. Text data may be extracted from video data.

Determining secondary data may include requesting secondary data from a database. Determining secondary data may include receiving secondary data from a database. Secondary data may be requested from one or more of a vehicle registration database, an identification document database, and a map database. Detecting a reference segment may include comparing extracted data with data received from a database.

Secondary data may be included with the reference segment. For example, secondary data may be stored with a reference segment comprising unstructured data.

In embodiments, a reference segment may include one or more fields in which determined secondary data may be included. The determined secondary data may be placed (e.g., saves, stored, copied, linked, etc.) in one or more fields associated with a reference segment. The one or more fields for a segment may be predetermined fields for an element (e.g., incident type, entity, narrative, etc.) with which the reference segment is associated. For example, a reference segment associated with entity of a person may include one or more fields for name, address, and license number. A reference segment for an entity of a vehicle may have one or more fields for a make, model, year, and license plate number. A reference segment associated with a firearm may have one or more of a make and model. A reference segment associated with a location may have fields associated with one or more of a street number and street address. Other fields for these and different elements may be predetermined for a reference segment according to various aspects of the present disclosure.

In embodiments, a reference segment may include a detected portion of unstructured data and secondary data determined in accordance with the detected portion of the unstructured data. The detected portion may include a subset of the unstructured data. For example, the detected portion may include a frame or image of video data in which a license plate number is detected to generate an entity associated with a vehicle. The detected portion may include a subset of pixels of an image in which a driver's license was detected to generate an entity associated with a person. The detected portion may include a subset of audio data in which a name and address are detected to generate an entity associated with a person. The detected portion may include a portion of audio data from which a narrative was generated. The detected portion may include a representative portion (e.g., a single frame, number of seconds of audio data, etc.) of the unstructured data from which the secondary data was determined. By including both the secondary data and the detected portion of the unstructured data, a basis of the secondary data may be identified.

In embodiments, both secondary data and the detected portion of a reference segment may be displayed. The reference segment may include information regarding what and/or how one or more parts of unstructured data or secondary data of the reference segment are to be displayed on the display of a computing device. The secondary data may be displayed adjacent the detected portion. By displaying the secondary data with (e.g., concurrently, near, proximate, etc.) the detected portion of the unstructured data, the unstructured data may be reviewed to verify the accuracy of the secondary data. The display may further provide a visual indication of the type of the reference type. For example, display of an image of a license plate number may provide visual indication that a reference segment is associated with an entity of a vehicle.

In embodiments, playback of unstructured data or a detected portion of the unstructured data may be enabled by the display of the detected portion of the unstructured data in a reference segment. For example, a portion of video data in which a license plate number was detected may be played back on a display of a computing device upon receipt of an input from a user interface device associated with a displayed, detected portion of the unstructured data of a reference segment.

At block 830, a determination may be made whether additional unstructured data has been received. If so, detection is repeated at block 820. Block 820 may be repeated for each received set of unstructured data to detect one or more reference segments among one or more received sets of unstructured data. Multiple reference segments may be detected from same or different unstructured data.

At block 840, detecting one or more reference segments may further include providing the segments. The segment may be transmitted to another computing device. The segments may be transmitted from a records management system. The segments may be transmitted for display. The segments may be transmitted for display in an interface. An interface may include a web interface at a remote computing device over a network. Detecting the one or more reference segments may include displaying the detected one or more reference segments.

After segments have been detected, a structured report may be generated. At block 850, one or more selection inputs may be received. A selection input may be received for one or more detected reference segments. A selection input may be associated with a selection of a reference segment for inclusion in a structured report. A selection input may be received via a user interface of a remote computing device. A selection input may comprise a single input for a plurality of detected reference segments.

At block 860, generating a structured report may include importing one or more selected reference segments. Importing one or more selected reference segments may include adding one or more of extracted data, requested data, or other secondary data associated with a reference segment to the structured report. In embodiments, the secondary data may be copied to the structured report.

Structured data from the extracted or secondary data may be added to a specific part of the report in accordance with a selection input. For example, a selection of text data may import the text data to one or more fields indicated by the selection. An input may cause structured data associated with a reference segment to be added to a displayed template.

Structured data may be added to a part of a structured report based on the type of a reference segment. For example, secondary data associated with a vehicle may be imported to a vehicle entity in a structured report. In such embodiments, a predetermined portion of structured data may be imported to a predetermined portion of a structured report based on a single import input. In such embodiments, multiple predetermined portions of structured data may all be imported to multiple predetermined portions of a structured report based on a single import input. As such, embodiments according to various aspects of the present disclosure may automate at least part of a report generation process, thereby reducing use of processing resources of a computing device, reducing redundancy of information stored on a records management system, and improving accuracy of data included in a structured report.

At block 860, importing the reference segments may include linking the structured report to one or more sources of unstructured data from which the reference segments were detected. For example, a video file from a body camera may be linked (e.g., hyperlinked, displayed directly in a report, available for playback via the same interface, etc.) to the structured report. Such linking improves accountability of an origin of a structured report, while also enriching the variety of data available via the report for a reviewer.

At block 870, a structured report may be provided. The structured report may be printed. The structured report may be combined into a single file. The structured report may be locked from subsequent editing. After block 870, method 800 ends.

In embodiments, a number of reference segments detected in unstructured data may be significant. For example, a car accident involving multiple vehicles in a parking lot may involve numerous vehicles, drivers, and witnesses. Certain incidents may also involve multiple law enforcement officers and videos, including those that are formally assigned to the incident, as well as those that may voluntarily arrive at the incident to provide support or may pass a location of the incident en route to another incident. Unstructured data from a recording device associated with each law enforcement officer may further increase the number of reference segments that may be detected and potentially imported into a structured report. Embodiments according to various aspects of the present disclosure may address these and other issues.

Figure 9:
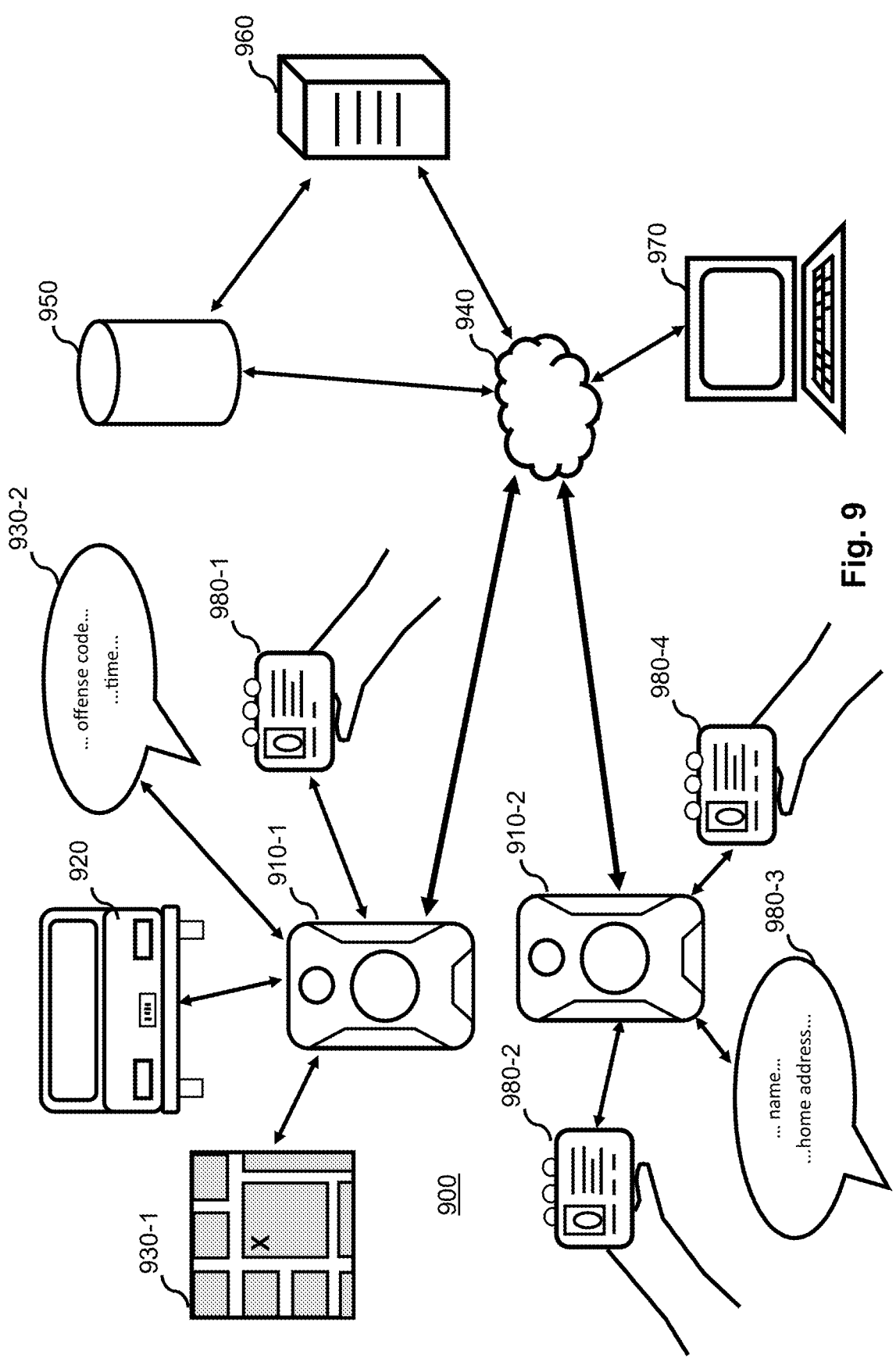
FIG. 9 illustrates an event for which a structured report is generated according to various aspects of the present disclosure.

FIG. 9 illustrates an example embodiment of generating a report according to various aspects of the present disclosure. In FIG. 9, an event 900 at a location has occurred. The event 900 is an event for which a structured report is generated. Event 900 involves recording devices 910, vehicle 920, incident or event information 930, and one or more persons 980. Unstructured data for the event 900 may be further transmitted by recording devices 910 to one or more servers 960 and/or data stores 950 via network 940. Unstructured data may alternately or additionally be transferred to one or more computing devices 970. One or more data stores 950, servers 960, and computing devices may further process the unstructured data for event 900 to generate structured data included in a report provided to one or more computing devices 970. Event 900 may include a burglary of vehicle 920 to which at least two responders respond with recording devices 910. The recording devices 910 may capture unstructured data including data indicative of offense information 930, vehicle 920, and persons 980 associated with the event 900.

Recording devices 910 may include one or more wearable (e.g., body-worn) cameras, wearable microphones, one or more cameras and/or microphones mounted in vehicles, and mobile computing devices. Recording devices 910 may include one or more of devices 110, 120, and 125 with brief reference to FIG. 1.

For event 900, recording device 910-1 is a wearable camera configured to capture a first set of unstructured data. Recording device 910-1 may be associated with a first responder. The first responder may be a first law enforcement officer. Recording device 910-1 may capture a first set of unstructured data comprising first video data and first audio data. The first set of unstructured data may also comprise other sensor data, such as data from a position sensor and beacon data from a proximity sensor of the recording device 910-1. Recording device 910-1 may capture the set of unstructured data throughout a time of occurrence of event 900, without or independent of any manual operation by the first responder, thereby allowing the first responder to focus on gathering information and activity at event 900.

In embodiments, a set of unstructured data captured by recording device 910-1 may include information corresponding to one or more of offense information 930, vehicle 920, and a first person 980-1. First offense information 930-1 may include a location of the recording device 910-1 captured by a position sensor of the recording device 910-1. Second offense information 930-2 may include an offense type or code captured in audio data from a microphone of recording device 910-1. Information corresponding to first person 980-1 may be recorded in video data captured by first recording device 910-1. In embodiments, first person 980-1 may be a suspect of an offense at event 900. In embodiments, unstructured data in a set captured by recording device 910-1 may further include proximity data indicative of one or more signals received from recording device 910-2, indicative of the proximity of recording device 910-2.

In embodiments, recording device 910-2 is a second wearable camera. Recording device 910-2 may be configured to capture a second set of unstructured data. Recording device 910-2 may be associated with a second responder. The second responder may be a second law enforcement officer. Recording device 910-2 may capture a second set of unstructured data comprising second video data and second audio data. The second set of unstructured data may also comprise other sensor data, such as data from a position sensor and beacon data from a proximity sensor of the recording device 910-2. Recording device 910-1 may capture the second set of unstructured data throughout a time of occurrence of event 900, without or independent of any manual operation by the second responder, thereby allowing the second responder to focus on gathering information and activity at event 900.

In embodiments, a set of unstructured data captured by recording device 910-2 may include information corresponding to one or more a second person 980-2, a third person 980-3, and a fourth person 980-4 at event 900. Information corresponding to each of second person 980-2 and fourth person 980-4 may be recorded in video data captured by second recording device 910-2. For example, second person 980-2 and fourth person 980-4 may each show their respective driver's license to the second responder such that a video sensor of the second recording device 910-2 may capture images representing the driver's licenses and store the images in video data. Information corresponding to third person 980-3 may be recorded in audio data captured by second recording device 910-2. For example, third person 980-3 may state their name, home address, and date of birth while speaking to the second responder at event 900. In embodiments, second person 980-2, third person 980-3, and fourth person 980-4 may be witnesses of an offense at event 900. In embodiments, unstructured data in a set captured by recording device 910-2 may further include proximity data indicative of one or more signals received from recording device 910-1, indicative of the proximity of recording device 910-1 to recording device 910-2 at event 900.

In embodiments, recording devices 910-1, 910-2 may be configured to transmit first and second sets of unstructured data to one or more servers 960 and/or data stores 950 for further processing. The set of unstructured data may be transmitted via network 940, which may include one or more of each of a wireless network and/or a wired network. The sets of unstructured data may be transmitted to one or more data stores 950 for processing including short-term or long-term storage. The sets of unstructured data may be transmitted to one or more servers 960 for processing including determining secondary data and/or generating one or more reference segments associated with each unstructured data in each set of unstructured data. The sets of unstructured data may be transmitted to one or more computing devices 970 for processing including playback prior to and/or during generation of a report. In embodiments, the sets of unstructured data may be transmitted prior to conclusion of event 900. The sets of unstructured data may be transmitted in an ongoing manner (e.g., streamed, live streamed, etc.) to enable processing by another device while event 900 is occurring. Such transmission may enable reference segments to be available for import prior to conclusion of event 900 and/or immediately upon conclusion of event 900, thereby decreasing a time required for a responder and computing devices associated with a responder to be assigned or otherwise occupied with a given event.

In embodiments, unstructured data may be selectively transmitted from one or more recording devices prior to completion of recording of the unstructured data. An input may be received at the recording device to indicate whether the unstructured data should be transmitted to a remote server for processing. For example, a keyword (e.g., keyword 511 with brief reference to FIG. 5) may indicate that audio data should be immediately transmitted (e.g., uploaded, streamed, etc.) to a server. The immediate transmission may ensure or enable certain portions of a set of unstructured data to be available at or prior to an end of an event. In embodiments, unstructured data relating to a narrative portion of a structured report may be immediately transmitted to a server for detection of a reference segment corresponding to the narrative.

In embodiments, reference segments generated by one or more servers 960 may be transmitted to another computing device upon being generated. The reference segments may be transmitted by one or more of network 940 or an internal bus with another computing device, such as an internal bus with one or more storage devices 950. The reference segments may be transmitted to one or more storage devices 950 and/or computing devices 970. In embodiments the reference segments may also be transferred to one or more recording devices 910.

In embodiments, reference segments may be received for review and subsequent import into a structured report. The reference segments may be received by one or more computing devices 970. The reference segments may be received via one or more of network 940 and an internal bus. Computing devices 970 receiving the references may include one or more of a computing device 170, camera 110, a mobile computing device 125, and an MDT in vehicle 120 with brief reference to FIG. 1.

In embodiments, one or more computing device 970 may be configured to generate a structured report based on a received reference segment. The reference segment may be imported to complete one or more portions (e.g., forms, fields, etc.) of the structured report. In embodiments, one or more portions of the structured report itself may be generated based on a reference segment. By relying on automatically generated reference segments, efficiency of structured report generation may be significantly improved, allowing a responder to be available to respond to a next event.

Figure 10:
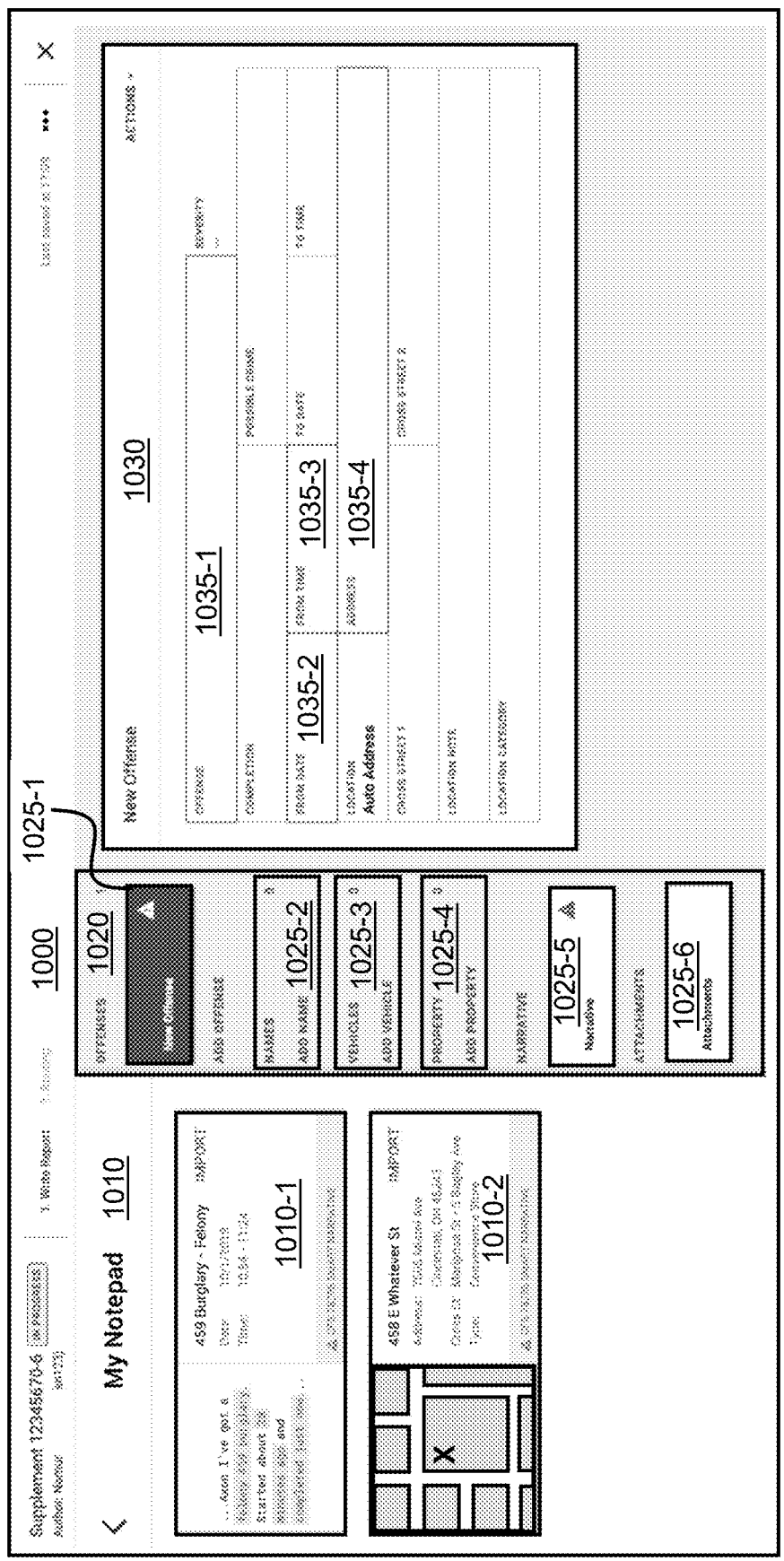
FIG. 10 illustrates an exemplary interface for generating structured reports according to various aspects of the present disclosure.

FIGS. 10-15 illustrate interfaces of a computing device associated with generating a structured report according to various aspects of the present disclosure. As shown in FIG. 10, an interface 1000 of a computing device for generating a structured report may include one or more reference segments 1010, at least one index 1020, and at least one form 1030 for a structured report. The segments 1010 may be displayed in a first portion of interface 1000, while index 1020 and form 103 may be respectively displayed in second and third portions of interface, each portion distinct from another portion of the interface. One or more inputs from one or more user interface devices may be received in each portion or combinations of portions of interface 1000 to generate a structured report. Interface 1000 may be displayed on a computing device, such as a computing device 970 with brief reference to FIG. 9. Interface 1000 may further enable one or more inputs to be received in accordance with interface 1000 at the computing device.

In embodiments, index 1020 may include one or more index elements 1025 associated with a different part or element of a structured report. Index 1020 includes a first index element 1025-1 for one or more incident types or offenses, a second index element 1025-2 for one or more entities associated with persons, a third index element 1025-3 for one or more entities associated with vehicles, a fourth index element 1025-4 for one or more entities associated with physical properties, a fifth index element 1025-5 for one or more entities associated with one or more narratives, and a sixth index element 1025-6 for one or more attachments. Each index element 1025 may be associated with a potential part of a structured report, though not all parts may be required for a structured report according to various aspects of the present disclosure. For example, an offense associated with index element 1025-1 and narrative associated with index element 1025-5 may be required parts of a structured report, while parts of a structured report associated with index elements 1025-2, 1025-3, 1025-4, and 1025-6 may be optional. By providing index elements 1025 for non-required parts of a structured report, index 1020 may enable direct and efficient entry and/or generation of one or more sets of structured data for a structured report. The index elements 1025 may also provide an indication of a state of completion of a structured report, such as whether one or more parts have been provided, as well as an indication of whether required parts still need to be entered before the structured report can be submitted or otherwise completed.

In embodiments, selection of one of index elements 1025 causes one or more reference segments 1010 to be filtered for display. The selection may include a selection input received for the one or more index elements 1025. A plurality of reference segments 1010 may have been detected in unstructured data. The reference segments 1010 may be generated from different unstructured data recorded on different recording devices. However, not all reference segments may be related to a part of a structured report currently being generated. Accordingly, selection of one of index elements 1025 may cause only reference segments associated with the selected one of the index elements 1025 to be displayed. Such an arrangement may decrease the number of reference segments that need to be accessed and displayed by a computing device, thereby conserving resources of the computing device on which the interface 1000 is displayed. Filtering may also ensure that incorrect structured data is not added to incorrect part of a structured report. For example, filtering may ensure that structured home address for a person is not in advertently included in a location of an offense when an event does not occur at the home address of the person, even though both the home address of the person and the location of the event may be captured in unstructured data. In embodiments, detecting a reference segment may include generating indicia of one or more parts of a structured report to which a reference segment may be associated, such that filtering based on a given part of the structured report may be performed. Providing the reference segments 1010 in accordance with a received selection input may include generating filtered reference segments and displaying the filtered reference segments. In embodiments, only the filtered reference segments may be displayed. Reference segment of a plurality of reference segments not included in the filtered reference segments may not be displayed in response to a selection received via an index element associated with the filtered reference segments. Rather, reference segments of a plurality of filtered reference segment may be provided in accordance with a selection input received for a different index element.

In interface 1000, interface element 1025-1 has been selected, causing first reference segments 1010-1 and second reference segment 1010-2 to be displayed. First reference segment 1010-1 and second reference segment 1010-2 may be filtered among a plurality of reference segments detected from a plurality of sets of unstructured data, such as recorded by recording devices 910 with brief reference to FIG. 9.

First reference segment 1010-1 includes secondary data determined from unstructured data. The secondary data may include offense information. The offense information may include one or more of an offense code, offense date, and offense location. The offense information may be detected in audio data recorded by a recording device. Reference segment 1010-1 may include data corresponding to each detected offense information in a respective field of reference segment 1010-1. Reference segment 1010-1 may further include information corresponding to a detected portion of unstructured data from which the secondary data was determined. For example, reference segment 1010-1 includes one or more highlighted portions of text data transcribed from unstructured data corresponding to audio data.

Second reference segment 1010-2 includes secondary data determined from unstructured data. The secondary data may include location information. The location information may include one or more of a physical address, address number, street name, city name, state name, and location category. The location information may be determined from both position data recorded by a recording device and data obtained from a data source external to a recording device. Particularly, the location information may include global position information from position data of a recording device. This global position information may be used by a detection engine to obtain additional location information from a database of geographic information that may provide additional physical address information and a location category in response to global position information. The detection engine, such as engine 730 of FIG. 7, may request the additional information from the geographic information database while processing the sensor data in a received set of unstructured data. Respective fields of reference segment 1010-2 may include secondary data for each determined location information. Reference segment 1010-2 may further include information corresponding to a detected portion of unstructured data from which the secondary data was determined. For example, reference segment 1010-2 includes an image of a map corresponding to position information determined from unstructured data corresponding to position data.

In embodiments, each reference segment of the one or more reference segments 1010 may be selected. Each reference segment may be associated with a selection input element, such as element 315 with brief reference to FIG. 3. Alternately or additionally, each reference segment, as displayed, may include an individual selection input element by which the corresponding reference segment may be selected. Selection of a reference segment of the one or more reference segments 1010 may cause the reference segment to be imported.

In embodiments, selection of an index element 1025 of index 1020 for a particular part of a structured report may cause one or more forms to appear. For example, selection of index element 1025-1 may cause form 1030 to be displayed in interface 1000 on a computing device. Form 1030 may be associated with the part of a structured report to which index element 1025-1 corresponds. In embodiments, selection of one of index elements 1025 may cause both reference segments 1010 and form 1030 to be provided. As shown in FIG. 10, form 1030 is associated with an offense that may have occurred at an incident or event.

In embodiments, form 1030 may have one or more predetermined fields. The one or more predetermined fields may be associated with a part of a structured report being generated in accordance with a selection of one or more index elements 1025 of index 1020. For example, form 1030 includes fields associated with a new offense. The fields may include one or more of a field 1035-1 associated with an offense code, a second field 1035-2 associated with an offense start date, a third field 1035-3 associated with an offense start time, time, and a fourth field 1035-4 associated with an offense location address. In embodiments, other fields associated with other offense information may also be included form 430, including a field for each of one or more of an offense end time, an offense end date, a cross street of an offense location, and a location category. The one or more predetermined fields may be default fields for the associated part of the structured report. The one or more predetermined fields may be blank or empty, lacking any data upon first being generated and/or displayed with a form. Form 1030 may include no secondary data upon generation and/or initial display. In embodiments, form 1030 may be a template.

In embodiments, one or more fields of form 1030 may match one or more fields of one or more reference segments 1010. For example, one or more reference segments may include determined secondary data in fields corresponding to one or more of a start time, an end time, a start date, an end date, an offense code, and an address. A field of reference segment 1010-1 with data corresponding to an offense code may match an offense start time field 1035-1 in form 1030. A field of reference segment 1010-1 with data corresponding to a start date may match an offense start date field 1035-2 in form 1030. A field of reference segment 1010-1 with data corresponding to a start time may match an offense start time field 1035-3 in form 1030. A field of reference segment 1010-2 with data corresponding to an address may match an offense location address field 1035-4 in form 1030. One or more fields of reference segment 1010-2 may also match one or more fields of form 430 including one or more fields for each of a first cross street, second cross street, and/or a location category code.

In embodiments, secondary data may be in fields of different reference segments. For example, first reference segment 1010-1 may include secondary data in fields corresponding to a start time, end time, start date, end data, and offense code. Second reference segment 1010-2 may include secondary data in fields corresponding to a location. Collectively, the reference segments may include secondary data associated with a same form 430. Such an arrangement may improve speed and efficiency of completing a part of a structured report, including when multiple sets of unstructured data are available. Such an arrangement may also ensure completeness and/or accuracy, particularly when multiple reference segments are detected from same or different unstructured data, including same or different sets of unstructured data.

In embodiments, importing one or more reference segments 1010 to a form 1030 may include selecting the reference segments 1010 for import. As noted elsewhere herein, one or more reference segments 1010 may be selected for import at a same time. Concurrent import may be provided via selection of a common selection input element, such as element 315 with brief reference to FIG. 3. Individual reference segments may also be selected via a respective selection input element associated with each one of the individual reference segments. For example, a selection input element may include a hyperlink displayed on a given one of the reference segments 1010, enabling secondary data associated with the individual reference segment to be imported. In embodiments, a series of reference segments may be individually imported to a structured report in accordance with selection of a series of selection input elements.

In embodiments, one or more fields of a form 130 may not match fields of one or more reference segments 1010. These one or more fields may require manual or other user input from a user interface in order to be completed with corresponding data. Accordingly, form 1030, once completed, may include one or more fields with data imported from one or more reference segments 1010 and one or more different field with data generated after display of form 1030 in accordance with an input from a user interface device. By importing data for at least some fields of a form, a structured report may be completed faster, decreasing an amount of time during which a computing device and associated resources are assigned or otherwise required to generate a given report.

In embodiments, importing a reference segment may include not selecting one or more reference segments of a plurality of reference segments for import. For example, a selection input may be received for reference segment 1010-1, but may not be received for reference segment 1010-2 according to various aspects of the present disclosure. Accordingly, secondary data of reference segment 1010-1 may be imported into a structured report and secondary data of reference segment 1010-2 may not be imported into the structured report in accordance with the received selection inputs.

Figure 11:
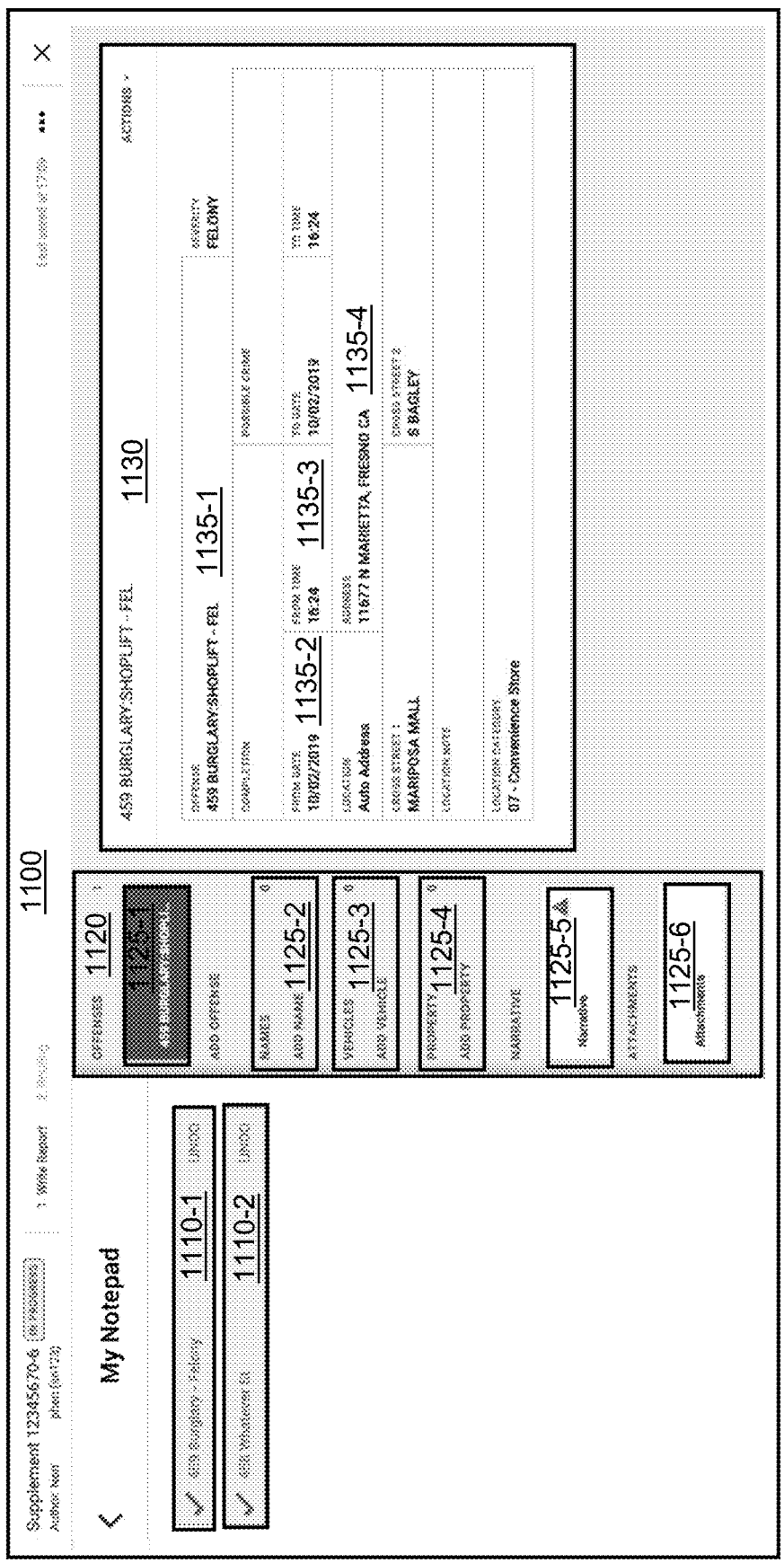
FIG. 11 illustrates an exemplary interface for generating structured reports according to various aspects of the present disclosure.

FIG. 11 illustrates an exemplary web interface 1100 for generating structured reports according to various aspects of the present disclosure. Interface 1100 includes one or more reference segments 1110, index 1120, and form 1130. Interface 1100 may correspond to interface 1000 and one or more reference segments 1110, index 1120, and form 1130 may correspond to one or more reference segments 1010, index 1020, and form 1030 after one or more selection inputs are received for one or more reference segments 1010 by interface 1000. Index 1120 may include one or more index elements 1125-1-1125-6, which may correspond to one or more index elements 1025-1-1025-6. Form 1130 may include one or more fields 1135-1-1135-4, which may correspond to one or more fields 1035-1-1035-4 in embodiments according to various aspects of the present disclosure.

Reference segments 1110 may include imported reference segments. Reference segments may include a first reference segment 1110-1 and a second reference segment 1110-2.

In embodiments, a display of reference segments 1110 may include one or more indicia associated with an imported state of the reference segment. For example, a color of reference segment 1110-1 may be different relative to a color employed to display reference segment 1110-1 when reference segment 1110-1 was not imported. In another example, fewer fields of secondary data may be displayed for an imported reference segment 1110-1 relative to when reference segment 1110-1 is not imported.

In embodiments, importing one or more reference segments 1110 may include adding one or more fields of secondary data from the one or more reference segments 1110 to one or more of index 1120 and form 1130. Index 1120 may be updated to include at least one field of secondary data from the one or more reference segments 1110. For example, index element 1125-1 of index 1120 may be updated to include secondary data from an offense code field of reference segment 1110-1 upon import of reference segment 1110-1. In another example, one or more fields 1135-1-1135-4 of form 1130 may be updated to include secondary data from one or more matching fields of reference segment 1110-1 and reference segment 1110-2 upon import of reference segment 1110-1 and reference segment 1110-2.

In embodiments, importing a reference segment may include copying secondary data from the reference segment to matching fields of a form. For example, secondary data for an offense code, start date, and start time from reference segment 1110-1 may be copied to an offense code field 1135-1, offense start date field 1135-2, and offense start time field 1135-3 respectively. A secondary data for an address from reference segment 1110-2 may be copied into an offense address location field 1135-4 for form 1130. In embodiments, copying the secondary data, rather than moving the secondary data into form may enable reference segments 1110 to remain available for import into other structured reports, including a second structured report generated by another user of the system and/or another event that may have occurred at a same location of a first event. In embodiments, secondary data may be copied from multiple reference segments at a same time and/or to a same form as discussed elsewhere herein. In embodiments, secondary data may be copied from multiple reference segments in response to receipt of a same single input select at a computing device in embodiments according to various aspects of the present disclosure.

In embodiments, reference segments 1110 may include an undo input element. Receiving an input from a user interface device for an undo input element may cause one or more fields of secondary data to be removed (e.g., deleted, marked as invalid or false, etc.) from a form. a same time and/or to a same form as discussed elsewhere herein. An individual undo input element may be included for each reference segment 1110, enabling individual secondary data of forms associated with an individual reference segment to be removed in response to an undo input, rather than removing all secondary data from a form 1130.

Figure 12:
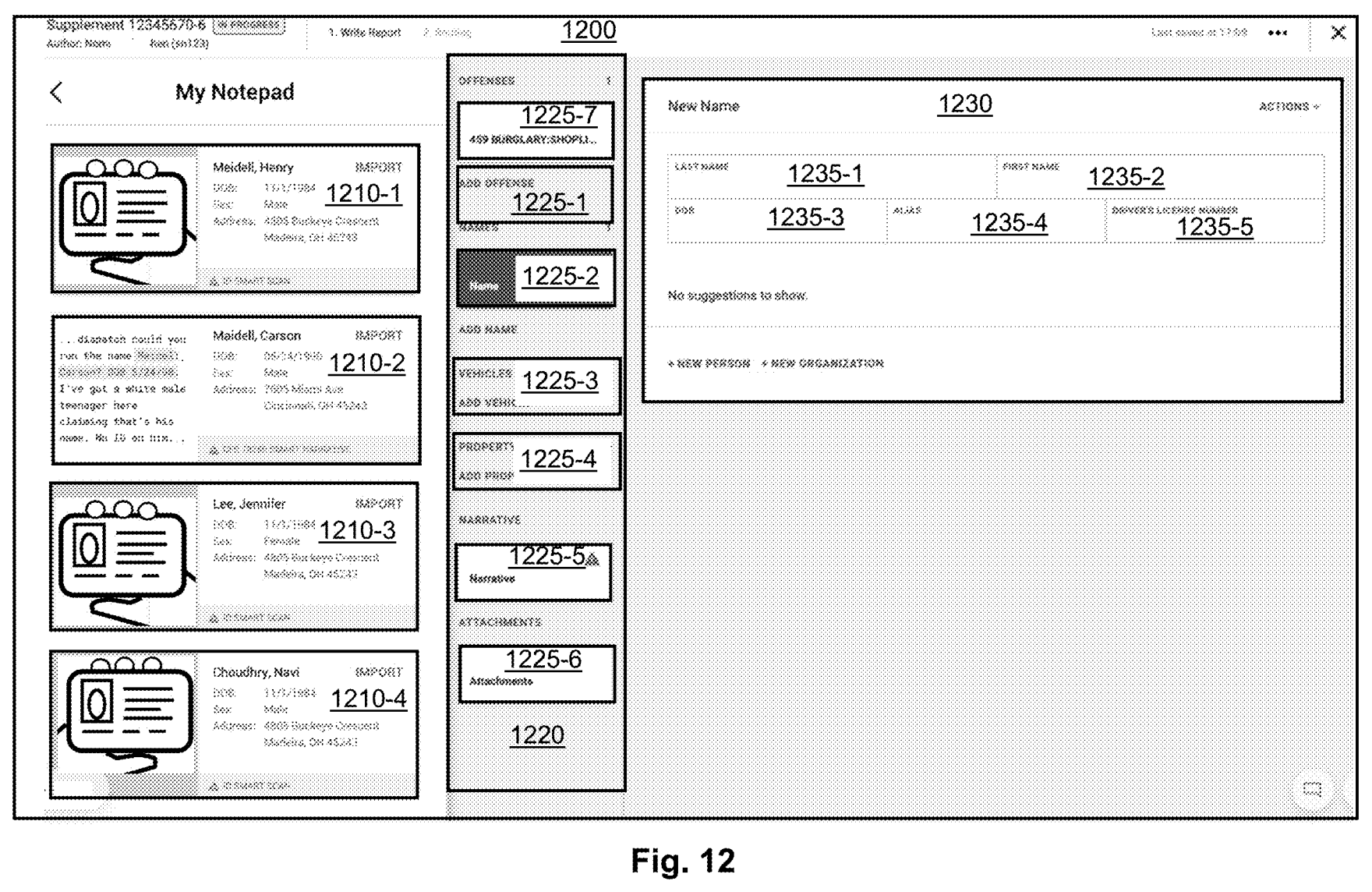

In embodiments, other parts or elements of a structured report may be completed using other index elements of an interface. FIG. 12 illustrates an exemplary web interface 1200 for generating structured reports according to various aspects of the present disclosure. Interface 1200 and one or more of its components may correspond to one or more of interfaces 300-500 or 1000-1100 of FIGS. 3-5 and 10-11 in embodiments according to various aspects of the present disclosure. Interface 1200 may include one or more reference segments 1210, index 1220, and form 1230. Index 1220 may include one or more index elements 1225-1-1225-6. Form 1230 may include one or more fields 1235-1-1235-4.

In embodiments, first reference segment 1210-1 includes secondary data determined from unstructured data. The secondary data may include information associated with an entity of a person. The person information may include one or more of a first name, last name, date of birth, alias, and license number. The person information may be detected in video data recorded by a recording device. Reference segment 1210-1 may include data corresponding to each detected person information in a respective field of reference segment 1210-1. Reference segment 1210-1 may further include information corresponding to a detected portion of unstructured data from which the secondary data was determined. For example, reference segment 1210-1 includes an image of video data in which a license of a person may be detected and information for the person may be extracted. In embodiments, the image of the video data may include a subset of the pixels of the image in which the license of the person was detected.

Second reference segment 1210-2 includes secondary data determined from unstructured data. The secondary data may also include information associated with an entity of a person. The person may be different from a person associated with reference segment 1210-1. The person information may also include one or more of a first name, last name, and date of birth. However, the person information of reference segment 1210-2 may be detected in audio data recorded by a recording device, rather than video data. The secondary data reference segment 1210-2 may include text data corresponding to person information transcribed from audio data. Reference segment 1210-2 may further include information corresponding to a detected portion of unstructured data, such as a highlighted portion of text data transcribed from audio data.

In embodiments, third reference segment 1210-3 and fourth reference segment 1210-4 may each include secondary data determined from unstructured data. These reference segments 1210-3, 1210-4 may be similar to reference segment 1210-1, except that they may each include information in secondary data corresponding to different persons, detected in accordance with different portions of unstructured data. Fields of each of reference segment 1210-1-1210-4 may be same or similar, but include different secondary data corresponding to different person entities. In embodiments, a reference segment for a given type of entity, such as person, vehicle, or property, may have same fields as reference segments of a same type, but different fields relative to other one or more reference segments of one or more different types.

In embodiments, reference segments 1210 may be detected from different sets of unstructured data. For example, reference segment 1210-1 may be detected in video data from a first recording device, such as recording device 910-1 of FIG. 9. Reference segments 1210-2, 1210-3, 1210-4 may be detected in video data from a second recording device, such as recording device 910-2 of FIG. 9. Displaying reference segments 1210 may include filtering for reference segments associated with person entities, but not restricting reference segment according to a recording device from which unstructured data for the reference segment was recorded. Accordingly, interface 1200 enables reference segments from a same event, but different recording devices to yet be imported into a same structured report.

In FIG. 12, an input associated with index element 1225-2 has been received. Index element 1225-2 may be associated with an entity of a person. Accordingly, reference segments 1210 may be selected among a plurality of reference segments detected from unstructured data for an event. The reference segments 1210 may be selected because they correspond to a same entity type, while reference segments associated with other entity types or other reference types may not be displayed.

In embodiments, different reference segments may be displayed for different parts of a structured report. For example, reference segments 1210 may be different from each reference segment displayed in response to a selection input received for index element 1225-3. The one or more reference segment displayed in accordance with selection of each index element 1125 may be completely different, such that a same reference segment may not be displayed for two different index elements.

In embodiments, one or more index elements 1225 of index 1220 may correspond to a form that includes imported data. For example, index element 1225-7 may correspond to a form for which secondary data has been imported. A selection received for index element 1225-7 via a user interface device may cause a part of a structured report being edited to change to a part of the structured report associated with another form, aside from form 1230, such as form 1130 of interface 1100.

In embodiments, one or more index elements 1225 of index 1220 may correspond to a form that does not include imported data. The form may be a default form or template comprising one or more fields for which secondary data may be subsequently imported or otherwise provided. For example, index element 1225-2 may correspond to form 1230 for which secondary data has not yet been imported. A selection received for index element 1225-2 via a user interface device may cause a part of a structured report being edited to correspond to a part of the structured report associated with form 1230. In embodiment, index 1120 may include a combination of index elements 1225 that are associated with forms in which secondary data has been imported and forms for which secondary data has not been imported. Selecting the respective input elements of index elements 1225 may cause the respective form to be displayed on interface 1200.

In embodiments, each reference segment of the one or more reference segments 1210 may be selected. Each reference segment may be associated with a selection input element, such as element 315 with brief reference to FIG. 3. Alternately or additionally, each reference segment, as displayed, may include an individual selection input element by which the corresponding reference segment may be selected. Selection of an individual reference segment of the one or more reference segments 1210 may cause the individual reference segment to be imported.

In embodiments, selection of an index element 1225 of index 1020 for a particular part of a structured report may cause one or more forms to appear. For example, selection of index element 1225-2 may cause form 1230 to be displayed in interface 1200 on a computing device. Form 1230 may be associated with the part of a structured report to which index element 1225-2 corresponds. As shown in FIG. 12, form 1230 and index element 1225 are each associated with an entity of a person identified at an incident or event.

In embodiments, form 1230 may have one or more predetermined fields. The one or more predetermined fields may be associated with a part of a structured report being generated in accordance with a selection of one or more index elements 1225 of index 1220. For example, form 1230 includes fields associated with a person. The fields may include one or more of an field 1235-1 associated with a last name of the person, a second field 1235-2 associated with a first name of the person, a third field 1235-3 associated with a date of birth of the person, a fourth field 1235-4 associated with an alias of the person, and a fifth field 1235-5 associated with a license number of the person. The one or more predetermined fields may be default fields for the associated part of the structured report. The one or more predetermined fields may be blank or empty, lacking any data upon first being generated and/or displayed with a form. Form 1230 may include no secondary data upon generation and/or initial display.

In embodiments, one or more fields of form 1230 may match one or more fields of one or more reference segments 1210. For example, one or more reference segments 1210 may include determined secondary data in fields corresponding to one or more of a last name, first name, alias, date of birth, and license number. These fields may be a same field as presented in fields 1235 of form 1230. To provide data in these fields, one or more reference segments 1210 may be selected to be imported and then imported in accordance with the selection as discussed elsewhere herein.

Figure 13:
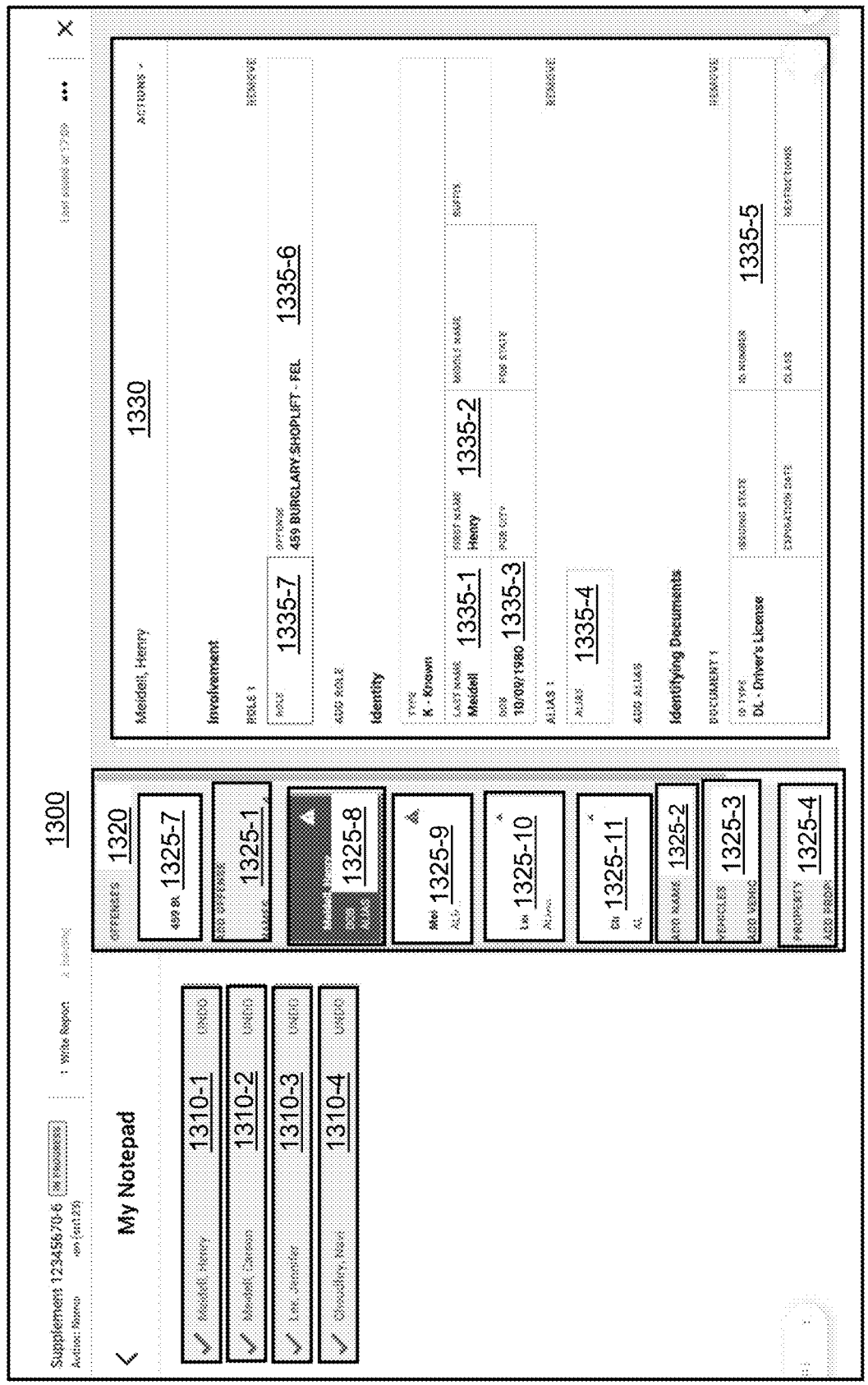
FIG. 13 illustrates an exemplary interface for generating structured reports according to various aspects of the present disclosure.

FIG. 13 illustrates an exemplary web interface 1300 for generating structured reports according to various aspects of the present disclosure. Interface 1300 includes one or more reference segments 1310, index 1320, and form 1330. Interface 1300 may correspond to interface 1200 and one or more reference segments 1210, index 1320, and form 1330 may correspond to one or more reference segments 1210, index 1220, and form 1230 after one or more selection inputs are received for one or more reference segments 1210 at interface 1200. Index 1320 may include one or more index elements 1325-1-1325-4 and 1325-7, which may correspond to one or more index elements 1225-1-1225-4, 1225-7. Index 1320 may also include one or more additional index elements 1325-8-1325-11. Form 1330 may include one or more fields 1335-1-1335-5, which may correspond to one or more fields 1235-1-1235-5 of interface 1200 in embodiments according to various aspects of the present disclosure.

In embodiments, reference segment 1310 are configured to indicate that secondary data has been imported into a structured report from the reference segments 1310. Various indicators may indicate an imported status of the reference segments 1310, including a change in color of the reference segment 1310, as well as a decrease in a number of displayed fields of secondary within each of first reference segment 1310-1, second reference segment 1310-2, third reference segment 1310-3, and fourth reference segment 1310-4. A decrease in the displayed number of fields and corresponding secondary data for each of the reference segment 1310 may visually indicate that a decreased amount of information needs to be considered for importing into a structured report, as it has already been imported.

In embodiments, index 1320 may also be configured to indicate that secondary data has been imported into a structured report. One or more additional index elements 1325-8-1325-11 may have been created in index 1320. Each additional index elements 1325-8-1325-11 may correspond to an imported reference segment 1310. For example, index element 1325-8 may correspond to imported reference segment 1310-1, index element 1325-9 may correspond to imported reference segment 1310-2, index element 1325-10 may correspond to imported reference segment 1310-3, and index element 1325-11 may correspond to imported reference segment 1310-4. Additional index elements 1325-8-1325-11 are new relative to index elements 1225 of index 1220 of interface 1200 prior to the import of reference segments 1210. Additional index elements 1325-8-1325-11 may each correspond to a respective new form being created for the structured report.

In embodiments, index 1320 may be configured to indicate each new form that has been created for each imported reference segment 1310. For example, additional index elements 1325-8-1325-11 may provide access to a respective imported reference segment 1310. For example, index element 1325-8 may provide access to form 1330, while other index elements 1325-9-1325-11 may provide access to other forms. The access may include displaying the corresponding form in a same portion of interface 1300. The access may include enabling manual data entry for a displayed form. For example, a selection input received for index element 1325-8 causes form 1330 to be displayed and further enables inputs associated with manually entered text data to be provided in one or more fields of form 1330, such as field 1335-7.

In embodiments, form 1330 may be automatically generated by a computing device upon import of one of reference segments 1310. For example, form 1330 may be created to receive secondary data from imported reference segment 1310-1. Generating form 1330 may include creating a copy of a template for an entity, such as a person entity. Secondary data from associated reference segment 1310-1 may then be added to the template to generate form 1330. Generating forms for other reference segments 1310-2-1310-4 may include copying and completing a same template as copied for form 1330.

In embodiments, fields 1335 of form 1330 may include secondary data from associated reference segment 1310-1. The secondary data may be included based on a match between a field in which the secondary data was provided in reference segment 1310-1 and field 1335 of form 1330. For example, field 1335-1 for last name information of a person may match a field for last name information of a person in reference segment 1310-1. Based on the match, import of reference segment 1310-1 into a structured report may include copying secondary data from the field for last name information in reference segment 1310-1 to field 1335-1 for last name information of form 1330. Field 1335-2 for first name information, field 1335-3 for a date of birth information, field 1335-4 for alias information, and field 1335 for an identification number information may respectively match fields for first name information, date of birth information, alias information, and a license number information of reference segment 1310-1. Secondary data for these fields 1335-2-1335-5 may be copied from the matching fields of reference segment 1310-1 as well.

In embodiments, generating form 1330 may include generating form 1330 in accordance with a reference segment being imported. For example, reference segment 1310-1 for form 1330 pertains to person information obtained from a driver's license. In this arrangement, additional information for a person may be available for form 1330 compared to other sources of information. For example, a driver's license may include a date of issuance of a license to a person or a height of a person. Accordingly, a template selected as a basis of form 1330 may include such fields. The generating may include selecting and copying a template for form 1330 after reference segment 1310 has been selected for import. The generating may include identifying a source of unstructured data for the reference segment and selecting a template for form 1330 in accordance with the identified source of reference segment 1310-1. One or more fields 1335 for form 1330 may be identified, selected, and/or created to receive secondary data from reference segment 1310-1 after reference segment 1310-1 has been selected for import into a structured report. In another example, another portion of unstructured data, such as audio data, may include a first name, last name, and data of birth. Accordingly, generating a form for this example may include copying a template with different and/or fewer fields to be filled with secondary data, such as a template associated with form 1230 in interface 1200 with brief reference to FIG. 12. Such an arrangement may save storage space on a computing device for form 1330 that may otherwise be used to store fields that will not receive secondary data after reference segment 1310-1 has been imported. Generating a number of fields for form 1330 in accordance with reference segment 1310-1 may also reduce an extent of data to be displayed and/or reviewed, particularly for fields that can not, will not, or do not need to be completed for a structured report based on reference segment 1310-1.

In embodiments, generating form 1330 may include dividing and/or copying secondary data from a field of a reference segment into two or more fields of a form. For example, a same secondary data from reference segment 1310-1, such as data for first name information and last name information, may be copied into multiple fields of form 1330 for such information. In another example, a field of driver's license information of reference segment 1310-1 may be transferred to two or more fields of form 1330, including identification number field 1335-5 and another field for identification document type information. In form 1330, this last field may be completed with data indicating that an identification document associated with reference segment 1310-1 is a driver's license. In other embodiments, separate such fields may already exist in reference segment 1310-1, precluding the need to divide corresponding secondary data upon import into form 1330 for the structured report associated with interface 1330.

In embodiments, generating form 1330 may include providing one or more fields 1335 for which secondary data is not imported. Such fields 1335 may require additional input to be completed. Such inputs may include inputs from a user interface device, corresponding to manual data entry. For example, a field 1335-6 associated with role information for a person entity may exist, but data may not be included therein. A user may provide an input via a user interface device (e.g., keyboard, mouse, touchscreen, microphone, etc.) to provide text data for field 1335-6. Generating empty field 1335-6 may provide indication of data further required for a structured report to be completed.

In embodiments, generating a form may include importing secondary data from another form. The secondary data may correspond to secondary data imported to the other form from another reference segment. The other reference segment may not be available for import on interface 1300, yet related secondary data may yet be included in form 1330. Such an arrangement may decrease a number of inputs necessary to generate a structured report, copying information already imported to one or more fields of a report without requiring repeated import or even duplicate display of reference segments. For example, field 1335-7 includes offense code information copied from a form associated with index element 1325-7. The secondary data may be imported into the other form and then automatically copied into form 1330 upon generation of form 1330. In embodiments, generating form 1330 may include identifying one or more forms previously created, identifying secondary data associated with an entity type for which form 1330 is generated, creating one or more fields for a previously created form, and importing secondary data for at least one field of the one or more created fields. The one or more fields may include a combination of one or more empty fields and one or more fields in which secondary data has been copied. In other embodiments, secondary data of a related form may be automatically copied from a reference segment associated with the related form, rather than the related form itself.

In embodiments, another form may be generated for each other reference segment 1310-2-1310-4 upon import of these reference segments 1310. Certain other forms may be same or similar to form 1330, though include different secondary data associated from a respective reference segment 1310 for which the other form is generated. Some of the other forms may include different fields in accordance with receiving secondary data of a reference segment detected from a different type of unstructured data. For example, a form associated with information in audio data may have one or more different fields relative to a form associated with information from image data or video data of an identification document for a person. Yet, independent of a source of unstructured data, each of multiple forms may be concurrently generated. Different forms associated with different sources of unstructured data may be automatically and/or simultaneously completed according to various aspects of the present disclosure. Importing multiple concurrent reference segments 1310 may include automatic generation of multiple forms, including form 130. Multiple different forms, including different forms with same or different fields, may be generated in response to a same, single selection input associated with a same, single selection input element, decreasing the time and inputs that may be otherwise necessary to generate a structured report.

Figure 14:
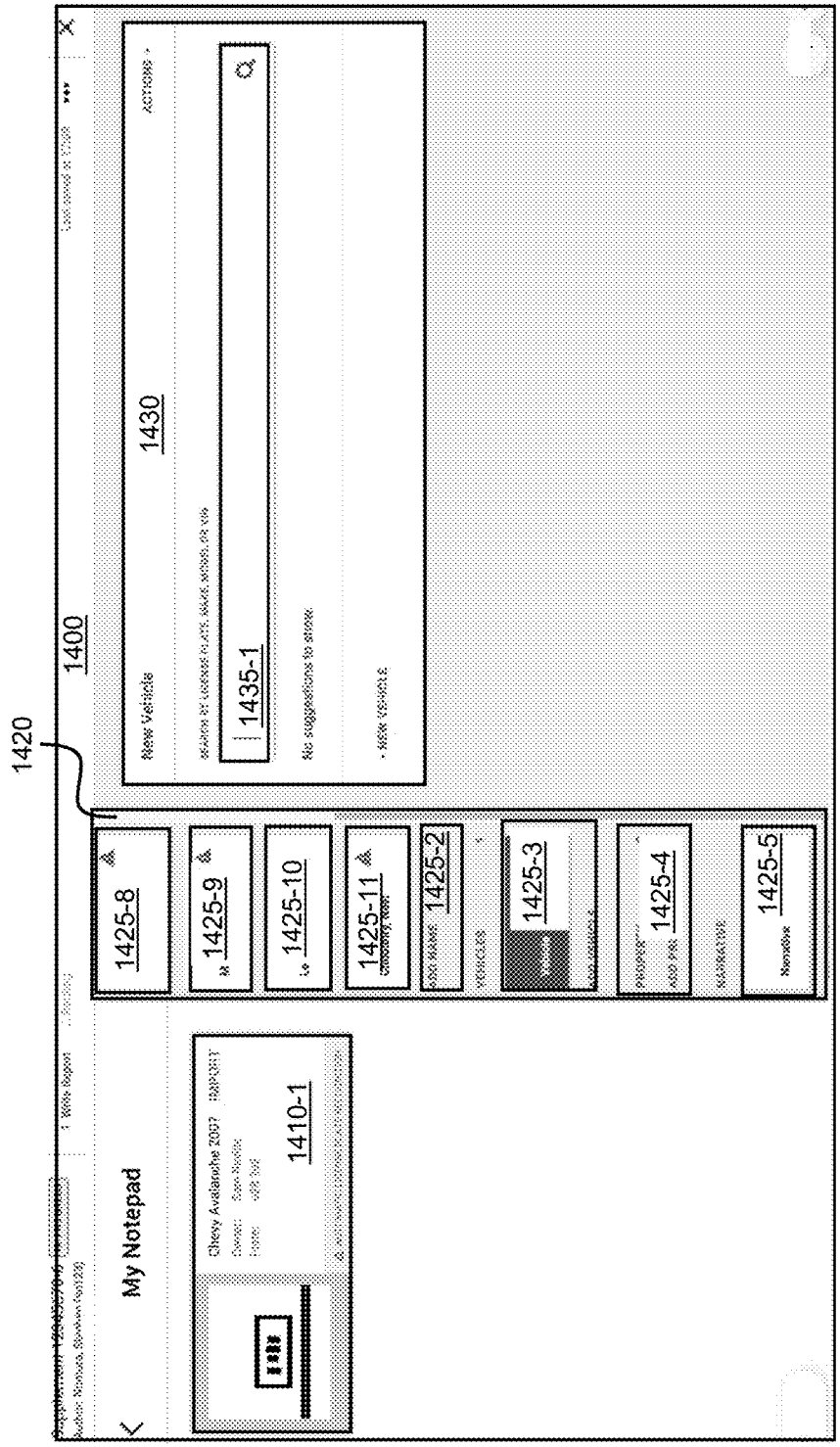
FIG. 14 illustrates an exemplary interface for generating structured reports according to various aspects of the present disclosure.
Figure 15:
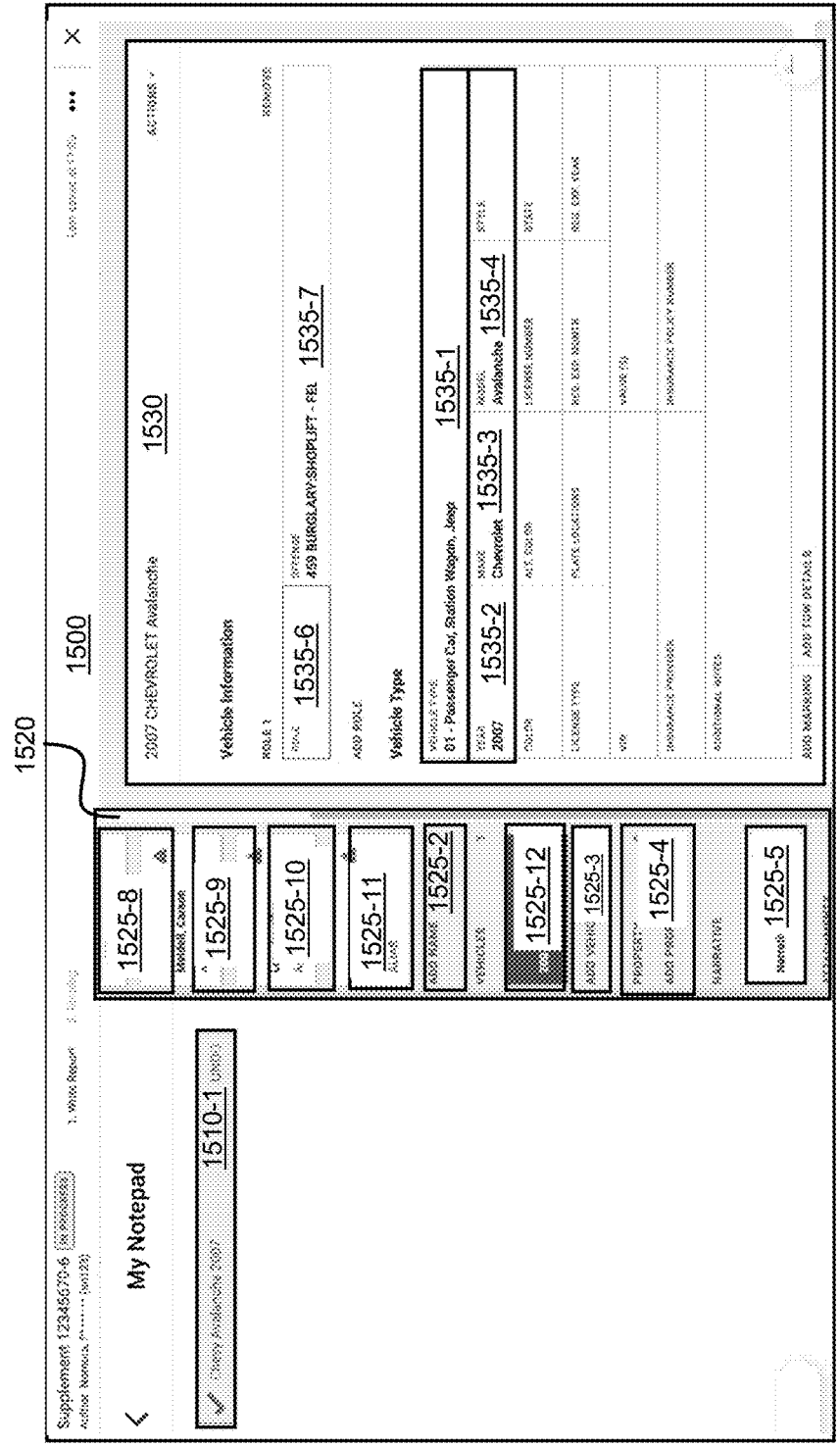
FIG. 15 illustrates an exemplary interface for generating structured reports according to various aspects of the present disclosure.

In embodiments, reference segments for other entity types may be imported into a structured report. For example, FIG. 14 illustrates an example interface 1400 for an entity of a vehicle and FIG. 15 illustrates an example interface 1500 for an imported vehicle entity for a structured report according to various aspects of the present disclosure. A vehicle associated with each vehicle entity in interfaces 1400 and 1500 may be a same vehicle, such as vehicle 920 with brief reference to FIG. 9.

Interface 1400 may include reference segments 1410 associated with a vehicle. Particularly, reference segment 1410-1 includes information corresponding to a vehicle detected in video data. Fields of reference segment 1410-1 include secondary data determined from the detected license plate. For example, fields of reference segment 1410-1 may include make information, model information, year information, license plate number information, and license plate state information.

Interface 1400 may further include index 1420. Index 1420 may include index elements 1425, including index elements 1425-2-1425-4 and index elements 1425-8-1425-11. Index 1420 may include other index elements, though these index elements may not be displayed in interface 1420 in accordance with a display position of interface 1420.

Particularly, a display position of index 1420 may be scrolled to permit different index elements 1425 to be displayed and accessed. An input associated with index element 1425-3 may cause reference segments associated with vehicle entities to be displayed, including reference segment 1410-1.

Interface 1400 may further include form 1430. Form 1430 may correspond to a default template for an entity type. For example, a default set of fields 1435 may be displayed for form 1430 prior to import or entry of data for form 1430.

In embodiments, field 1435-1 may provide a search function. For example, inputs associated with make, model, or license plate number information may be entered into field 1435-1. When the entered information matches a vehicle identified in a database of vehicle information, one or more additional fields may be subsequently generated, including one or more fields in which data has been copied from the database. Such a function and arrangement may enable a vehicle entity that has not been detected in unstructured data at an event to be added to a structured report. For example, if reference segment 1410-1 does not correspond to a vehicle to be added to a structured report via interface 1400, information for the vehicle may be added via the search function of field 1435-1 of form 1430 instead. When the information of reference segment 1410-1 does match a vehicle to be added to a structured report, reference segment 1410-1 may be imported as discussed elsewhere herein.

FIG. 15 illustrates an interface 1500 for generating a structured report according to various aspects of the present disclosure. Interface 1500 may include one or more reference segments 1510, index 1520, and form 1530. Reference segments 1510 may include imported reference segment 1510-1. Secondary data from fields of reference segment 1510-1 may be copied to form 1530. Upon import of reference segment 1510-1, an index element 1525-12 may be created in index, enabling access to form 1530. Other index elements 1525-3-1525-5 and 1525-8-1525-11 may enable access to other forms.

Form 1530 may include one or more fields 1535. Fields 1535 may include a first field 1535-1 for vehicle type information, second field 1535-2 for vehicle year information, third field 1535-3 for vehicle make information, and fourth field 1535-4 for vehicle model information. Each of these fields 1535-1-1535-4 may include secondary data copied from reference segment 1510-1.

Form 1530 may include one or more empty fields, such as field 1535-6. Empty field 1535-6 may be associated with vehicle role information for the vehicle associated with imported reference segment 1510-1. Data for field 1535-6 may be input or otherwise received after form 1530 is created.

Form 1530 may include one or more automatically completed fields, such as field 1535-7. Field 1535-7 may include data automatically added from another form, such as a form associated with another one of index elements 1525 of index 1520. Field 1535-7 may include data corresponding to offense code information for the structured report generated via interface 1500. In embodiments, fields 1535-6 and 1535-7 may be automatically added or generated for form 1530 in accordance with the prior generation of another form.

Figure 16:
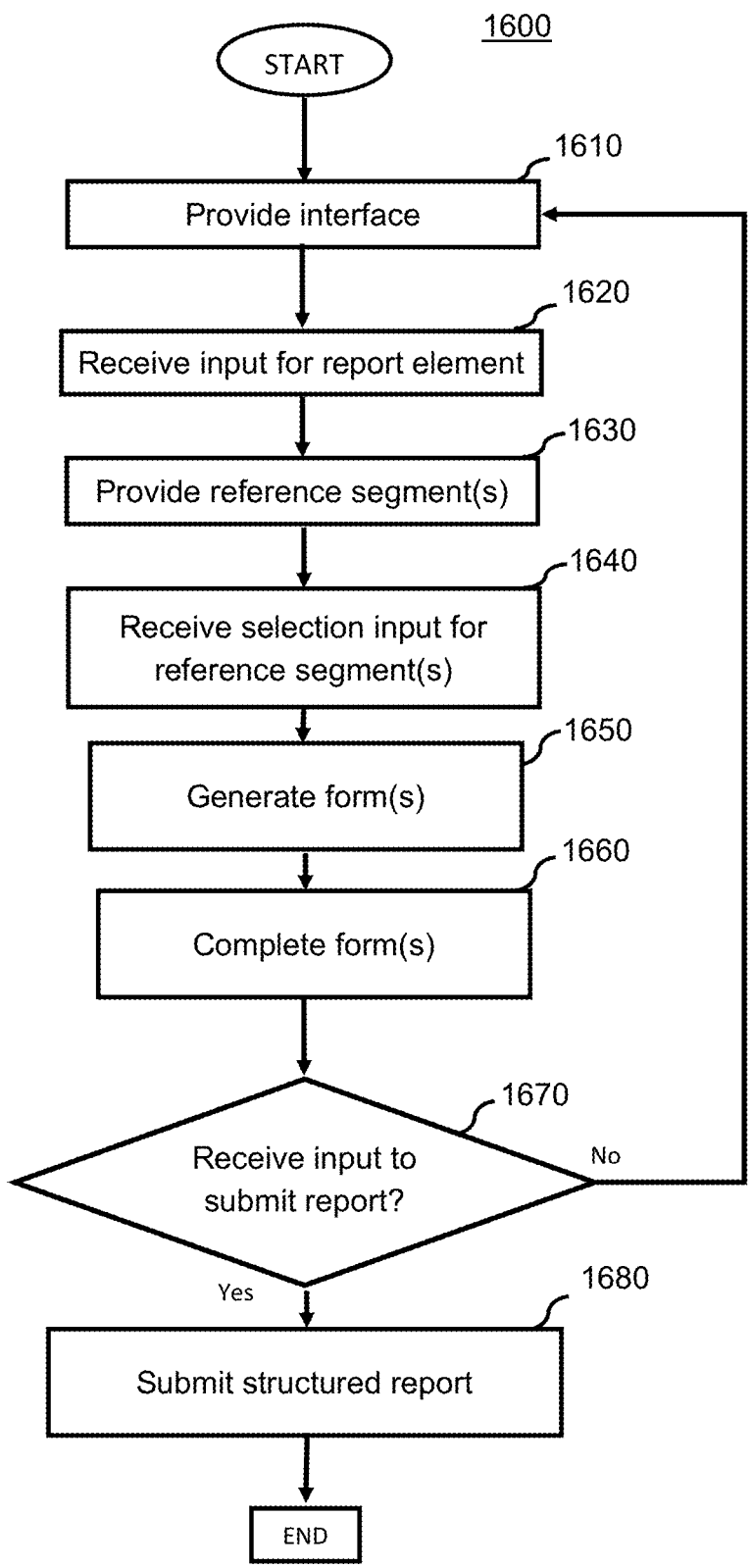
FIG. 16 is a diagram of a method of generating a structured report according to various aspects of the present disclosure.

FIG. 16 illustrates a method 1600 of generating a structured report according to various aspects of the present disclosure. In embodiments, method 1600 may include one or more steps or processes discussed herein. In embodiments, method 1600 may correspond to one or more blocks of method 800, such as blocks 850-870. In embodiments, method 1600 may be performed by one or more computing devices. The computing device may be in communication with a remote server and/or data store. For example, the computing device may correspond to one or more of mobile communication device 125, an MDT in vehicle 120, and computing device 170 with brief reference to FIG. 1. In embodiments, the one or more computing devices may include at least a server and a local computing device.

After start, method 1600 may provide 1610 an interface for generating a structured report. The interface may include one or more index elements associated with each of one or more elements of a structured report. An input may be received by the interface via each of the one or more index elements. The interface may be provided 1610 at a local computing device. In embodiments, one or more elements indicated via the provided 1610 interface may be received from a server. In embodiments, indication of the provided 1610 interface may also be transmitted to and/or received from a server.

After providing 1610, method 1600 may include receiving 1620 an input associated with an element of the structured report to be added. The input may be associated with an index of an interface, such as index 1020 of FIG. 10. The input may be received among a plurality of index elements, each index element associated with a different element (e.g., offense or incident type, entity, or narrative) related to an event. The input may be received 1620 at a local computing device, such as device 970 of FIG. 9. In embodiments, the input may be received 1620 after unstructured data has already been transmitted to a server and/or data storage. In embodiments, the input may be received 1620 after one or more reference segment have been detected from unstructured data.

Upon receiving 1620 an input, one or more reference segments may be provided 1630. Providing 1630 the reference segments may include displaying the reference segments on a display of a local computing device, which may be a same computing device at which an input was previously received. Providing 1630 the reference segments may include transmitting a request for reference segments to a server associated with a received input. Providing 1630 the reference segments may include receiving the reference segments from a server. In embodiments, providing 1630 the reference segments may include filtering the reference segments from a plurality of reference segments available. The plurality of reference segments may be related to a same event, though only provided 1630 reference segments may be associated with a given element to be added to a structured report. Providing 1630 the reference segments may include displaying a first form associated with a type of an element for which an input was previously received 1620. The firm form may be a default form, comprising one or more default fields for the element. In embodiments, the one or more provided reference segments may be detected from two or more different unstructured data, which may include two or more different types of unstructured data and/or unstructured data from two or more different recording devices.

After providing 1630 the one or more reference segments, at least one of the one or more reference segments may be selected 1640. Selecting 1640 may include receiving a selection input associated with each at least one reference segment. The input may be received at a local computing device. Selecting 1640 may include receiving a single selection for a plurality of reference segments, including all provided reference segments. Selecting 1640 may include transmitting an indication of the selecting 1640 to a server.

Upon selecting 1640 at least one reference segment, one or more forms may be generated 1650. Generating the one or more forms may include identifying one or more forms to be generated in accordance with the at least one reference segment. The forms may include a first form generated for an element, prior to receiving a selecting of an associated. A number of the forms may equal a number of reference segments selected 1640 for import. The forms may include a new form generated from a template of fields. The template may be duplicated to generate the form. Each form may include one or more fields in which data may be included. In embodiments, one or more of a local computing device and a server may generate 1650 the one or more forms and provide the generated form(s) to a local computing device.

After generating 1650 one or more forms, each form may be at least partially completed 1660. Each form may be at least partially automatically completed. At least one of the one or more forms may be fully completed. Completing 1660 a form of the one or more forms may include copying secondary data from a reference segment associated with the form. Completing 1660 a form may include matching a field of a reference segment with a field of the form and transferring secondary data from the field of the reference segment to the field of the form. In embodiments, completing 1660 the one or more forms may include updating an index associated with an interface. Completing 1660 the one or more forms may include creating one or more index elements configured to provide access to the form. Completing 1660 the one or more forms may also include receiving data associated with an input from a user interface device and including the data in one or more fields of the form. In embodiments, completing 1660 a form may be performed at one or more of a local computing device and a server.

After completing 1660 the one or more forms, method 1600 may include determining 1670 whether a next input associated with the report is received. If the submission input is received, the structured report may be submitted 1680 and method 1600 may end. If the submission input is not received, method 1600 may return to provide 1610 an interface.

Submitting 1680 the report may include transmitting information associated with one or more completed forms to a server. The information may include the one or more completed forms, each comprising at least one field that includes at least one imported secondary data detected from unstructured data. The information may include an indication that no additional edits will be received, enabling the structured report to be finalized. Submitting 1680 the structured report may include making the structured report and its associated fields and data read-only, such that the structured report may no longer be modified. One or more data in the structured report may be changed to reflect a read-only status for the structured report upon submitting 1680 the structured report. A submitted structured report may be provided to various computing devices, including one or more local computing devices directly from a first computing device or indirectly via one or more servers and/or data stores, such as server 960 and data store 950 with brief reference to FIG. 9.

Figure 17:
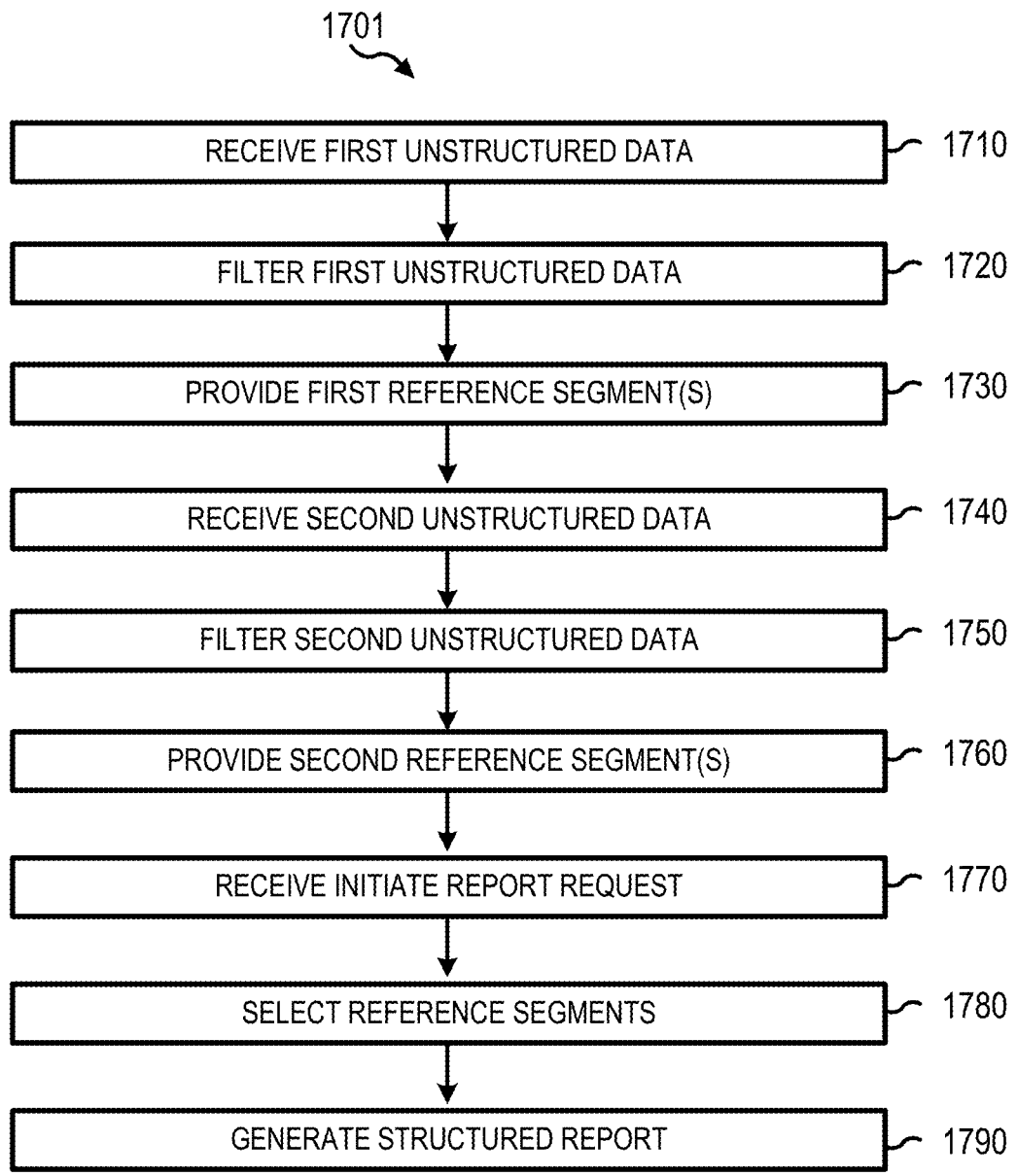
FIG. 17 is a diagram of a method of filtering unstructured data for a structured report according to various aspects of the present disclosure.

In various embodiments, and with specific reference to FIG. 17, a method 1701 of filtering unstructured data for a structured report is provided. In embodiments, method 1701 may be performed by one or more computing devices. The computing device(s) may be configured to perform one or more steps of method 1701 and/or any other method or process disclosed herein. For example, method 1701 may be performed by one or more of server 960, data store 950, and computing device 970 with brief reference to FIG. 9.

At block 1710, first unstructured data may be received. Receiving the first unstructured data may be similar to step 810 with brief reference to FIG. 8. First unstructured data may include one or more of audio data, video data, image data, position data, or text data from a first recording device. For example, first unstructured data may be received from camera 910-1 with brief reference to FIG. 9. Camera 910-1 may offload the first unstructured data while positioned at a location of an incident. For example, the first unstructured data may be transmitted via a long-range wireless network between camera 910-1 and server 960. In embodiments, a recording device on which the first unstructured data is initially recorded may automatically transmit the first unstructured data upon capture and/or recording of the first unstructured data.

At block 1720, first unstructured data may be filtered. Filtering may comprise detecting one or more first reference segments from the unstructured data. Filtering may comprise reducing a set of content data from the first unstructured data to generate filtered data. The filtered data may include secondary data. Filtering may comprise generating secondary data. Filtering may comprise generating a predetermined set of data for fields of secondary data. Filtering the first unstructured data may comprise reducing a size of the first unstructured data. For example, video data comprising a sequence of images may be reduced to a single representative frame, further including one or more fields of secondary data. The fields may comprise text data of which a size is significantly reduced relative to the original unstructured data. A size of the reference segments may be limited in accordance with a number and extent of fields associated with secondary data. For example, secondary data comprising ten fields may limit a size of a reference segment comprising the secondary data in accordance with a maximum size of data to complete each field of the secondary data. In embodiments, a size of a reference segment comprising a detected portion of the unstructured data and secondary data may be less than 30%, less than 20%, less than 10%, less than 5%, or less than 1% of a size of the unstructured data from which the reference segment is filtered.

At block 1730, one or more first reference segments may be provided. Providing the reference segments may comprise transmitting the one or more first reference segments to another computing device. For example, server 960 may transmit the one or more first reference segments to one of data store 950 and computing device 970. Providing the first reference segments may comprise storing the one or more first reference segments to another computing device. For example, one or more of data store 950 and computing device 970 may store the one or more first reference segments.

At block 1740, second unstructured data may be received. Receiving the second unstructured data may be similar to step 1710 and/or step 810 with brief reference to FIG. 8. Second unstructured data may include one or more of second audio data, video data, image data, position data, or text data. In embodiments, the second unstructured data may be received from a same first recording device from which first unstructured data was previously received. Accordingly, first unstructured data may be filtered at block 1720 and provided in a reduced form comprising one or more first reference segments before second unstructured data is further received from the first recording device. Such an arrangement may enable first reference segments to be received, reviewed, and/or verified while first recording device remains positioned at a location of an incident. In the event that one or more of the first reference segments are inaccurate or incomplete, the first recording device may be able to obtain additional unstructured data in order to properly and completely acquire one or more sets of data at an incident. The sets of data may be acquired in the second unstructured data. Such an arrangement may be particularly beneficial in the context of incident recording devices, as certain information may not be available to be acquired by a recording device after an incident has concluded.

In various embodiments, the second unstructured data may be received from a second recording device. For example, second unstructured data may be received from camera 910-2 with brief reference to FIG. 9. Camera 910-2 may offload the second unstructured data while positioned at a location of an incident. For example, the second unstructured data may be transmitted via a long-range wireless network between camera 910-2 and server 960. In embodiments, a recording device on which the second unstructured data is initially recorded may automatically transmit the second unstructured data upon capture and/or recording of the second unstructured data.

At block 1750, second unstructured data may be filtered. Filtering may comprise detecting one or more second reference segments from the unstructured data. Filtering may comprise reducing a set of content data from the second unstructured data. Filtering the second unstructured data may comprise reducing a size of the second unstructured data. For example, video data comprising a sequence of images may be reduced to a single, representative frame, further including one or more fields of secondary data. In embodiments. filtering at block 1750 may be similar to filtering at block 1720.

In embodiments, filtering 1750 may comprise different types of filtering relative to filtering at block 720. A first type of filtering performed upon first unstructured data may be different than a second type of filtering performed on second unstructured data. For example, first unstructured data may include content data of first video data from the first unstructured data and second unstructured data may include content data of second audio data of the second unstructured data. Accordingly, a first type of filtering applied to the first unstructured data may comprise an object recognition filter and a second type of filtering applied to the second unstructured data may include a speech recognition filter. The second filter type may not be applicable (i.e., able to be applied by a computing device) to the first unstructured data to filter the first unstructured data. Filtering 1750 may enable a different types of content data to be acquired at an incident, while still enabling the content data to be both processed to generate structured data and reduced in size for subsequent use.

At block 1760, one or more second reference segments may be provided. Providing the second reference segments may be similar to providing the first reference segments at block 1730. Providing the second reference segments may comprise transmitting the one or more second reference segments to another computing device. Providing the second reference segments may comprise storing the one or more second reference segments to another computing device. The other computing device may be a same computing device to which first reference segments may be and/or were provided. For example, first and second reference segments may be provided to data store 950 with brief reference to FIG. 9. In embodiments, the first and second reference segments may be provided to computing device 970. As noted above, computing device 970 may comprise an MDT mounted in a vehicle (e.g., vehicle 120 with brief reference to FIG. 1). In embodiments, the vehicle may be positioned at a location of an incident. Accordingly, and in various embodiments, unstructured data from two different recording devices and/or two different types of content data may be filtered and then related, structured data may be provided back to a same location at which the unstructured data was originally recorded. Such an arrangement may provide various benefits, including an ability to collect additional unstructured data from an incident and/or confirm that sufficient data has been collected for a structured report, including prior to departure of one or more entities from the location of the incident or other changes that may occur at the location of an incident.

At block 1760, an initiate report request may be received. The initiate report request may indicate that a structured report should be generated. The initiate report request may include an input received at a computing device. For example, an initiate report request may comprise a manual input received via a user interface at computing device 970. The request may be further transmitted to one or more of server 960 and data store 950 with brief reference to FIG. 9. The initiate report may include an incident identifier. For example, the request may include one or more of an incident identifier, a user identifier, and a location. In embodiments, a same computing device to which one or more reference segments may be provided may also receive the request. The structured data requested via the request may be generated and provided prior to the request being received. As noted above, the same computing device may include an MDT at a location of an incident (e.g., computing device 970 with brief reference to FIG. 9). Such an arrangement may further decrease an overall time necessary to generate the report, including when a basis of the report (e.g., one or more reference segments) is provided before initiation of the report is requested. By filtering unstructured data as discussed in the context of blocks 1710-1760, structured data may be available to complete a report as soon as the report is requested. Structured data to complete the report may be available and provided to a computing device before a portion of the report for completion is identified at the computing device. Embodiments according to various aspects of the present disclosure may preclude a need for additional set of data to be requested. Rather, data for completion of the report may be automatically provided to a computing device at the time the report is initiated.

At block 1770, one or more reference segments may be selected. The one or more reference segments may be provided responsive to an initiate report request. For example, one or more of computing device 970, server 960, and data store 950 may receive an initiate report request and, responsive to the request, select one or more reference segments for further generation of a structured report.

In embodiments, the one or more reference segments may be selected in accordance with an identifier. For example, the identifier may include a location of the computing device at which the request is first is received. Selecting the one or more reference segments may include selecting the one or more reference segments generated from unstructured data recorded at the location of the identifier. Accordingly, when a computing device (e.g., computing device 970) is at a location of an incident for which unstructured data was recorded, embodiments according to various aspects of the present disclosure may further automatically use such information to select structured data for the report, thereby decreasing an amount of time and input necessary to generate the structured report. In another example, the identifier may include a user identifier. Selecting the one or more reference segments may include selecting the one or more reference segments generated from unstructured data recorded by a recording device associated with the identifier. Accordingly, when a same user captures unstructured data with a recording device and submits an initiate report request, an association between the user and the recording device may be used to automatically select structured data for which a structure report may be subsequently generated. In embodiments, the identifier may include a time at which the request is received. Selecting the one or more reference segments may include selecting the one or more reference segments generated from unstructured data recorded most recently prior to the time associated with the identifier. Accordingly, when a computing device (e.g., computing device 970) provides a request immediately following the recording of unstructured data, embodiments according to various aspects of the present disclosure may further automatically use such information to select structured data that may be further used to generate the report. Selecting reference segments in accordance with information regarding both an initiate report request and the unstructured data from which the reference segments were filtered may further decrease an amount of data to be processed in order generate a structured report.

At block 1790, the structured report may be generated. Generating the structured report may comprise one or more steps as previous disclosed herein. For example, generating the structured report may comprise one or more of receiving input for report element at block 1620, receiving selection input for reference segments at block 1640, generating forms at block 1650, completing forms at block 1660, receiving an input to submit a report at block 1670, and submitting a structured report at block 1680, with brief reference to FIG. 16. Generating the structured report may comprise alternate or additional steps of FIG. 8, 16, and any other method or process disclosed herein. After block 1790, method 1701 may end. Embodiments of the disclosure include one or more computer-readable media storing instructions for generating a structured report that, when executed by one or more computing devices, are configured to cause the one or more computing devices to perform operations. The operations may comprise providing a first reference segment detected from first unstructured data recorded by a first recording device. The operations may comprise receiving a selection associated with the first reference segment. The operations may comprise importing the first reference segment into the structured report based on the received selection associated with the first reference segment. The first reference segment may include one or more fields, each field including secondary data determined based on the first unstructured data. The first reference segment may include a detected portion of the first unstructured data, the detected portion different from the secondary data. The instructions may be configured to further cause the one or more computing devices to provide a second reference segment. The first reference segment may be detected from first video data and the second reference segment may be detected from one of first audio data and second video data different from the first video data. The second reference segment may be detected from second unstructured data recorded by a second recording device, different from the first recording device. Receiving the selection may include receiving a single input associated with each of the first reference segment and the second reference segment. Importing the first reference segment may include importing the second reference segment into the structured report concurrently with the first reference segment. Providing the first reference segment may include filtering the first reference segment from a plurality of reference segments. Providing the first reference segment may include receiving an input associated with a part of the structured report. Providing the first reference segment may include filtering the plurality of reference segments in accordance with the received input to generate filtered reference segments, the filtered reference segments including the first reference segment. Providing the first reference segment may include displaying the filtered reference segments. Importing the first reference segment may include generating a form in accordance with the first reference segment. Importing the first reference segment may include completing the generated forms in accordance with the first reference segment. Importing the first reference segment may include copying secondary data from one or more first fields of the first reference segment into one or more second fields of a form of the structured report.

In this description herein of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A computer-implemented method for generating a structured report, the method comprising:

receiving, by a communication circuit of a computing device, first unstructured data recorded by a first body camera, wherein the first unstructured data is received from the first body camera via a network;

after the first unstructured data is received, detecting, by a processor of the computing device, a first reference segment from the first unstructured data recorded by the first body camera;

providing, by the processor of the computing device, the first reference segment detected from first unstructured data recorded by the first body camera;

after the first unstructured data is received and the first reference segment is detected, receiving, by the processor of the computing device, a selection associated with the first reference segment; and importing, by the processor of the computing device, the first reference segment into the structured report based on the received selection associated with the first reference segment.

2. The method of claim 1, wherein the first reference segment includes one or more fields, each field including secondary data determined based on the first unstructured data.

3. The method of claim 2, wherein the first reference segment includes a detected portion of the first unstructured data, the detected portion different from the secondary data.

4. The method of claim 1, further comprising:
providing, by the processor of the computing device, a second reference segment.

5. The method of claim 4, wherein:
the first reference segment is detected from first video data of the first unstructured data from the first body camera and the second reference segment is detected from second video data different from the first video data; and
providing the second reference segment comprises displaying the first reference segment and the second reference segment via a same user interface.

6. The method of claim 4, wherein the second reference segment is detected from second unstructured data recorded by a second body camera, different from the first body camera.

7. The method of claim 4, wherein receiving the selection includes receiving a single input associated with each of the first reference segment and the second reference segment.

8. The method of claim 4, wherein importing the first reference segment includes importing the second reference segment into the structured report concurrently with the first reference segment.

9. The method of claim 4, wherein:
the first reference segment and the second reference segment are associated with a same entity type; and
the first reference segment and the second reference segment correspond to different entities detected in accordance with different portions of the first unstructured data.

10. The method of claim 1, wherein providing the first reference segment includes filtering the first reference segment from a plurality of reference segments detected from the first unstructured data.

11. The method of claim 10, wherein providing the first reference segment includes:
receiving an input associated with a part of the structured report;
filtering the plurality of reference segments in accordance with the received input to generate filtered reference segments, the filtered reference segments including the first reference segment; and
displaying the filtered reference segments.

12. The method of claim 1, wherein importing the first reference segment includes generating a form in accordance with the first reference segment.

13. The method of claim 12, wherein generating the form comprises selecting a template for the structured report after the first reference segment is detected and the selection associated with the first reference segment is received.

14. The method of claim 1, wherein providing the first reference segment comprises:
transmitting the first reference segment to a mobile data terminal mounted in a vehicle, and wherein the vehicle is positioned at a location at which the first unstructured data is recorded by the first body camera; and
prior to receiving the selection, displaying the first reference segment via a screen of the mobile data terminal.

15. A computing device configured to generate a structured report, the computing device including:
a processor; and
at least one non-transitory storage media storing instructions that, when executed by the processor, are configured to cause the computing device to:
provide a first reference segment detected from first unstructured data recorded by a first recording device, the first reference segment including first secondary data generated from the first unstructured data;
provide a second reference segment detected from second unstructured data recorded by a second recording device different from the first recording device, the second reference segment including second secondary data generated from the second unstructured data, wherein the first reference segment and the second reference segment are provided for display via a user interface at a same time;
after the first reference segment and the second reference segment are provided for display, receive at least one selection input for the first reference segment and the second reference segment; and
import the first reference segment and the second reference segment into the structured report based on the at least one received selection input, wherein importing the first reference segment and the second reference segment includes transferring the first secondary data and the second secondary data into the structured report.

16. The computing device of claim 15, wherein:
the first secondary data includes first text data and the first unstructured data includes first video data; and
the second secondary data includes second text data and the second unstructured data includes at least one of second video data and first audio data.

17. The computing device of claim 15, wherein importing the first reference segment and the second reference segment includes at least one of:
importing the first reference segment and the second reference segment into the structured report at a same time;
importing the first reference segment and the second reference segment into the structured report in accordance with a same selection input of the at least one selection input; and
importing the first reference segment and the second reference segment into a same form of the structured report.

18. A system for generating a structured report from unstructured data comprising:
- a first recording device configured to generate first unstructured data;
- a second recording device configured to generate second unstructured data, the second recording device different from the first recording device; and
- a server in communication with each of the first recording device and second recording device, the server including:
  - a processor; and
  - at least one non-transitory storage media storing instructions that, when executed by the processor, are configured to cause the server to:
    - provide a first reference segment detected from the first unstructured data, the first reference segment including first secondary data generated from the first unstructured data;
    - provide a second reference segment detected from the second unstructured data, the second reference segment including second secondary data generated from the second unstructured data; and
    - generate the structured report, the generated structured report including the first secondary data and the second secondary data, wherein the first secondary data and secondary data are imported into the generated structured report in accordance with one or more selection inputs received for the first reference segment and the second reference segment.

19. The system of claim 18, wherein the first recording device is a first body camera, the second recording device is a second body camera, the first unstructured data includes first video data, and the second unstructured data includes at least one of second video data and first audio data.

20. The system of claim 18, wherein generating the structured report includes at least one of:
- importing the first reference segment and the second reference segment into the structured report at a same time;
- importing the first reference segment and the second reference segment into the structured report in accordance with a same selection input of the one or more selection inputs; and
- importing the first reference segment and the second reference segment into a same form of the structured report.

* * * * *